United States Patent
Duplessis et al.

(10) Patent No.: US 12,417,407 B2
(45) Date of Patent: Sep. 16, 2025

(54) SYSTEM AND METHOD FOR MACHINE LEARNING MONITORING

(71) Applicant: ROYAL BANK OF CANADA, Toronto (CA)

(72) Inventors: Francis Duplessis, Toronto (CA); Marjan Albooyeh, Toronto (CA); Nathaniel Hopp, Toronto (CA); Sam Chow, Toronto (CA); Mohammad Rafsan, Toronto (CA)

(73) Assignee: ROYAL BANK OF CANADA, Toronto (CA)

(*) Notice: Subject to any disclaimer, the term of this patent is extended or adjusted under 35 U.S.C. 154(b) by 898 days.

(21) Appl. No.: 17/592,151

(22) Filed: Feb. 3, 2022

(65) Prior Publication Data

US 2022/0245517 A1    Aug. 4, 2022

Related U.S. Application Data

(60) Provisional application No. 63/145,052, filed on Feb. 3, 2021.

(51) Int. Cl.
G06N 20/00        (2019.01)
(52) U.S. Cl.
CPC .................................. *G06N 20/00* (2019.01)
(58) Field of Classification Search
None
See application file for complete search history.

(56) References Cited

U.S. PATENT DOCUMENTS

| | | | | |
|---|---|---|---|---|
| 10,255,550 | B1* | 4/2019 | Simkoff | G06N 3/08 |
| 11,106,994 | B1* | 8/2021 | Batalov | G06N 5/04 |
| 11,151,471 | B2* | 10/2021 | Niininen | G06N 20/00 |
| 11,216,831 | B1* | 1/2022 | Holligan | G06Q 50/16 |
| 11,308,401 | B2* | 4/2022 | Taylor | G06N 3/006 |
| 11,568,308 | B2* | 1/2023 | Sahota | G06N 3/088 |
| 11,568,315 | B2* | 1/2023 | Durand | G06F 16/367 |
| 11,886,964 | B2* | 1/2024 | Sinha | G06F 11/3438 |
| 12,020,137 | B2* | 6/2024 | Gu | G06F 18/214 |
| 12,040,092 | B2* | 7/2024 | Kotanko | G06N 20/00 |
| 12,154,013 | B2* | 11/2024 | Bisson-Krol | G06F 18/2178 |
| 12,165,014 | B2* | 12/2024 | Choi | G06N 20/00 |

(Continued)

OTHER PUBLICATIONS

Technology. (May 3, 2022). Retrieved from Snorkel: https://www.snorkel.ai/technology/.

(Continued)

*Primary Examiner* — Maikhanh Nguyen
(74) *Attorney, Agent, or Firm* — Norton Rose Fulbright Canada LLP

(57) ABSTRACT

A machine learning model is monitored by generating a time series of discrete time bins; for each of the discrete time bins: generating data point labels predicted using a labeling function to apply weak labels to incoming data; for each of the data point labels, generating one or more metric values based on one or more metrics by comparing the data point label to output labels of the machine learning model from the incoming data; and generating an aggregate metric for the time bin based on the one or more metric values for the data point labels of the time bin; and identifying anomalies in the aggregate metrics of the time bins of the time series.

20 Claims, 10 Drawing Sheets

(56) References Cited

U.S. PATENT DOCUMENTS

| | | | |
|---|---|---|---|
| 12,242,954 B2* | 3/2025 | Bisson-Krol | G06N 20/10 |
| 2019/0258783 A1* | 8/2019 | Mehta | G06N 20/00 |

OTHER PUBLICATIONS

Resources. (May 3, 2022). Retrieved from Snorkel: https://www.snorkel.org/resources/.

Ane Blázquez-Garcia, Angel Conde, Usue Mori, and Jose A. Lozano. A review on outlier/anomaly detection in time series data, 2020.

João Gama, Indre Žliobaite, Albert Bifet, Mykola Pechenizkiy, and Abdelhamid Bouchachia. A survey on concept drift adaptation. ACM Comput. Surv., 46(4), Mar. 2014.

Daniel Kang, Deepti Raghavan, Peter Bailis, and Matei Zaharia. Model assertions for monitoring and improving ml models, 2020.

Alexander Ratner, Stephen H. Bach, Henry Ehrenberg, Jason Fries, Sen Wu, and Christopher Ré. Snorkel. Proceedings of the VLDB Endowment, 11(3):269-282, Nov. 2017.

Christopher Ré, Feng Niu, Pallavi Gudipati, and Charles Srisuwananukorn. Overton: A data system for monitoring and improving machine-learned products, 2019.

\* cited by examiner

SYSTEM AND METHOD FOR MACHINE LEARNING MONITORING

CROSS-REFERENCE

This application is a non-provisional of, and claims all priority to, U.S. Application No. 63/145,052 dated 2021 Feb. 3 and entitled SYSTEM AND METHOD FOR MACHINE LEARNING MONITORING, incorporated herein by reference in its entirety.

FIELD

This disclosure relates to machine learning models, in particular, evaluating performance of machine learning models where there is limited or no availability of ground-truth representations.

BACKGROUND

Much online monitoring of machine learning algorithms suffers from a lack of gold labels for incoming data. A gold label is an attribute pair that is reflective of a "ground truth" that can be used, for example, to assess an accuracy of a training set classification for a particular outcome. "Ground truth" labels are officially correct labels or labels in which there is high confidence. As such, it is difficult to understand when and why some performance changes may occur. Even if gold labels can eventually be obtained at a future point, such a delay can still cause trouble as a poor model may have been running in the meantime. Instead of "ground truth" labels, there may still be noisy labels available instead.

An example for a gold label would be: Assume one wanted to label documents by either "Is [Document Type]" and "Is not [Document Type]", if a lawyer would look at this document and stamp it with the "Is [Document Type]" then one would consider this as a gold label.

Example situations where there is a lack of ground truth labels includes less-explored areas of technology, specific applications where there is less commercial activity (and less investment into label generation), or new areas of applicability for a particular model. Accordingly, being able to assess machine learning performance without the benefit of gold labels is technically useful and valuable, as it aids expanding the practical applicability of machine learning systems.

SUMMARY

A machine learning monitoring and automated assessment approach is described in various embodiments described herein. The approach is adapted to utilizing weak supervision wherein labeling functions are utilized to assign labels to entire portions of a training set. The proposed approach of various embodiments described herein lends itself particular well to technical problems associated with machine learning models where a labeling function can be readily established, such as in respect of text classification problems, securities trading analysis, among others.

The machine learning monitoring and automated assessment is a computational approach that can be used to computationally monitor deployed models that are being used in production (e.g., client facing or in-use) systems as a warning mechanism tuned to issue alerts or cause downstream model changes upon detecting mismatches.

In particular, the mismatches, in some embodiments, can be used to detect (i) domain shifts (e.g., the incoming data points may start populating very different regions of a positive data manifold, where a model does not perform well on—while the positive data manifold does not significantly change, but the data points fall into a region where the model does not perform well), in respect of (ii) concept drifts (positive data manifold changes because of how the problem is defined), and/or in respect of (iii) model degradation, where the model performance relative to the positive data manifold as a whole is degrading or has begun to degrade, for example, as the model is being trained in real-time in online learning (e.g., new training data sets are impacting the performance of the model. Model shift is not always necessarily indicative of degradation, as the positive data manifold may be changing and the model shift over time may be advantageous as the model may be shifting in an advantageous way.

The machine learning assessment approach can be practically implemented in a machine learning monitoring system that is specially adapted to automatically assess and monitor the performance and health of machine learning models using programmatic labeling, despite a lack of "gold labels" through applying "weak labels" (e.g., obtained from a programmatic system), and then monitoring metrics associated with the "weak labels" in respect of the model outputs. The weak labels are generated using one or more labeling functions, and the labeling function itself can be modified and adapted to changing requirements, such as through the amending of a class definition, re-computing labels to better adapt to a region or shape to improve the accuracy of the weak labels.

Each of the labeling functions can be used as a proxy for a particular region of operation of the model, and the labeling functions can generate weak data point labels that can be weak positive or weak negative labels. When the labeling function is used, for example, for a specific coverage manifold (e.g., region), it can return a result if the labeling function can confidently confirm/deny that a point falls within the labeling function, and abstain otherwise (e.g., an input point does not fall within the labeling function, so it is not confident in generation of any results). A number of different labeling functions may be necessary, as each labeling function covers a particular coverage manifold, and for a given set of input points x, it is very possible that only certain labeling functions are activated/relevant. For example, the system would not be able to return useful results if all input points x are provided to the labeling functions, but the labeling functions all abstain from providing results.

The labeling functions are also utilized to assess and monitor a particular model's performance, and as described in various embodiments below, machine learning outputs can be automatically generated that may be potentially indicative of different types of technical problems associated with shifts, such as domain (where the distribution of input data changes) or concept drifts (where the relationship between the input data and the labels changes). In a variant embodiment, the system is also configured to monitor the functioning characteristics of the labeling functions themselves to determine whether a labeling function has been accurate or relevant, and flag/cause a swap of a labeling function as required.

Discrepancies between the model prediction outputs and labeling function outputs are identified, and aggregated (e.g., in a time-series analysis) to establish an estimated score (e.g., a daily mismatch count as identified in aggregated statistics), and this estimated score could be a data output value that is indicative of a deviation from a norm that is received or monitored by a downstream alert/alarm system that automatically updates a dashboard or other user interface, or automatically generates service tickets or workflows to remediate or investigate the identified potential issues.

The data output value, in an embodiment, can be configured to track mismatches or anomalies over a period of time, and in a variation, an alert or alarm or downstream investigation/remediation workflows can be triggered through the detection of time-series outputs or signals generated from the mismatches or anomalies over the period of time.

Embodiments described herein describe, a system for assessing performance of a target trained machine learning model having a model predicted positive data manifold adapted to conduct classification based on an unknown true positive data manifold representative of a ground truth (e.g., from gold labels which are frequently not available) for a task being conducted by the target trained machine learning model.

The system is a computer system that comprises a processor coupled with computer memory and data storage, the processor configured to generate, a set of one or more labeling functions, each adapted for high precision by having a substantial intersection with the unknown true positive data manifold within a corresponding specific coverage manifold. Each of the one or more labeling functions can be used to generate a set of corresponding weak data point labels whereby given an input x, the one or more labeling functions outputs y if the one or more labeling function is confident that input x is within the corresponding specific coverage manifold, and abstains from an output if one or more labeling function is not confident that input x is within the corresponding specific coverage manifold.

The labeling functions serve as imperfect proxies to represent portions of an unknown positive data manifold region, and for the purposes of machine learning assessment, they can be dynamically utilized over a period of time (e.g., with new incoming data points or even a set of static data points) to output classifications that can then be tested against the model outputs to identify any mismatches that could occur over time. A mismatch occurs when the labeling function and the model output disagree with one another, and it may be indicative of a potential problem with the model (e.g., the model has shifted such that it has degraded), or model performance is poor due to issues with distributions with training data, among others.

As described below, the labeling functions can be defined with a greater ease relative to attempting to generate gold labels to define the unknown positive data manifold region, but the system, as an automated machine learning model assessment system, is also limited based on the relevance and potential imprecision of the labeling functions themselves.

In operation, the processor periodically receives one or more incoming data points corresponding to new incoming data or simply test data sets for processing through the target trained machine learning model, and generates one or more weak data point labels using the one or more labeling functions corresponding to the one or more incoming data points, and generates one or more classification outputs using the target trained machine learning model corresponding to the one or more incoming data points.

With these generated weak data point labels and classification outputs, the system processor can identify a quantity or characteristics of classification mismatches between the one or more weak data point labels and the one or more classification outputs. The system can then generate an alert signal relating to the target trained machine learning model based on a comparison of the quantity of classification mismatches relative to a threshold value.

These alert signals can be used to flag models for investigation. In a further embodiment, the alert signals include control instructions to cause the swapping of a model or the removal of a model from production deployment (e.g., shifting the model to a test environment for investigation). Swapping of a model could include conducting a "roll back" of the model to an earlier trained version, potentially before degradation of the model. This is useful where a certain training set used to train the model in real-time was problematic and caused a degradation of the model only after it was utilized.

In some embodiments, the model predicted positive data manifold changes over time as the target trained machine learning model is periodically updated through iterative training, or wherein a distribution of the one or more incoming data points changes over time.

In some embodiments, the quantity of classification mismatches between the one or more weak data point labels and the one or more classification outputs is tracked over a duration of time.

In some embodiments, the comparison of the quantity of classification mismatches relative to a threshold value includes tracking mean squared errors between corresponding weak data point labels and corresponding classification outputs for each of the one or more incoming data points.

In some embodiments, the target trained machine learning model operates in an online setting where incoming data is sequentially received in discrete instances, and the processor is further configured to: discretize time into a plurality of time bins; and wherein the identification of the quantity of classification mismatches between the one or more weak data point labels and the one or more classification outputs is conducted on a per-time bin basis.

In some embodiments, the alert signal is generated if the classification mismatches for any bin is greater than a threshold value.

In some embodiments, the alert signal is generated if the classification mismatches across a set of time bins of the plurality of time bins indicates a positive slope greater than a threshold value.

In some embodiments, the alert signal causes a de-commissioning or a substitution of the target trained machine learning model.

In some embodiments, the alert signal causes a re-training of the target trained machine learning model.

In some embodiments, the classification mismatches between the one or more weak data point labels and the one or more classification outputs is determined as a mean square error.

According to an alternate aspect, there is provided a method for assessing performance of a target trained machine learning model having a model predicted positive data manifold adapted to conduct classification based on an unknown true positive data manifold representative of a ground truth for a task being conducted by the target trained machine learning model. The method comprising the following steps, which can be provided in various orders generating, a set of one or more labeling functions, each adapted for high precision by having a substantial intersection with the unknown true positive data manifold within a corresponding specific coverage manifold.

Each of the one or more labeling functions configured to generate a set of corresponding weak data point labels whereby given an input x, the one or more labeling functions outputs y if the one or more labeling function is confident that input x is within the corresponding specific coverage manifold, and abstains from an output if one or more labeling function is not confident that input x is within the corresponding specific coverage manifold.

The method further comprises periodically receiving one or more incoming data points corresponding to new incoming data for processing through the target trained machine learning model, generating one or more weak data point labels using the one or more labeling functions corresponding to the one or more incoming data points, and generating one or more classification outputs using the target trained machine learning model corresponding to the one or more incoming data points.

Given these generated weak data point labels and classification outputs, the method further comprises identifying a quantity of classification mismatches between the one or more weak data point labels and the one or more classification outputs. The method can then comprise generating an alert signal relating to the target trained machine learning model based on a comparison of the quantity of classification mismatches relative to a threshold value.

In some embodiments, the model predicted positive data manifold changes over time as the target trained machine learning model is periodically updated through iterative training, or wherein a distribution of the one or more incoming data points changes over time.

In some embodiments, the quantity of classification mismatches between the one or more weak data point labels and the one or more classification outputs is tracked over a duration of time.

In some embodiments, the comparison of the quantity of classification mismatches relative to a threshold value includes tracking mean squared errors between corresponding weak data point labels and corresponding classification outputs for each of the one or more incoming data points.

In some embodiments, the target trained machine learning model operates in an online setting where incoming data is sequentially received in discrete instances, and the processor is further configured to: discretize time into a plurality of time bins; and wherein the identification of the quantity of classification mismatches between the one or more weak data point labels and the one or more classification outputs is conducted on a per-time bin basis.

In some embodiments, the alert signal is generated if the classification mismatches for any bin is greater than a threshold value.

In some embodiments, the alert signal is generated if the classification mismatches across a set of time bins of the plurality of time bins indicates a positive slope greater than a threshold value.

In some embodiments, the alert signal causes a de-commissioning or a substitution of the target trained machine learning model.

In some embodiments, the alert signal causes a re-training of the target trained machine learning model.

According to an alternate aspect, there is provided a non-transitory computer readable medium, storing machine-interpretable instruction sets which when executed by a processor, cause the processor to perform a method. Said method for assessing performance of a target trained machine learning model having a model predicted positive data manifold adapted to conduct classification based on an unknown true positive data manifold representative of a ground truth for a task being conducted by the target trained machine learning model.

Said method comprising the following, generating, a set of one or more labeling functions, each adapted for high precision by having a substantial intersection with the unknown true positive data manifold within a corresponding specific coverage manifold. Each of the one or more labeling functions configured to generate a set of corresponding weak data point labels whereby given an input x, the one or more labeling functions outputs y if the one or more labeling function is confident that input x is within the corresponding specific coverage manifold, and abstains from an output if one or more labeling function is not confident that input x is within the corresponding specific coverage manifold.

The method further comprising periodically receiving one or more incoming data points corresponding to new incoming data for processing through the target trained machine learning model, generating one or more weak data point labels using the one or more labeling functions corresponding to the one or more incoming data points, and generating one or more classification outputs using the target trained machine learning model corresponding to the one or more incoming data points.

With these generated weak data point labels and classification outputs, the method further comprises identifying a quantity of classification mismatches between the one or more weak data point labels and the one or more classification outputs. The method can then comprise generating an alert signal relating to the target trained machine learning model based on a comparison of the quantity of classification mismatches relative to a threshold value.

Other features will become apparent from the drawings in conjunction with the following description.

BRIEF DESCRIPTION OF DRAWINGS

In the figures which illustrate example embodiments.

DETAILED DESCRIPTION

Figure 1:
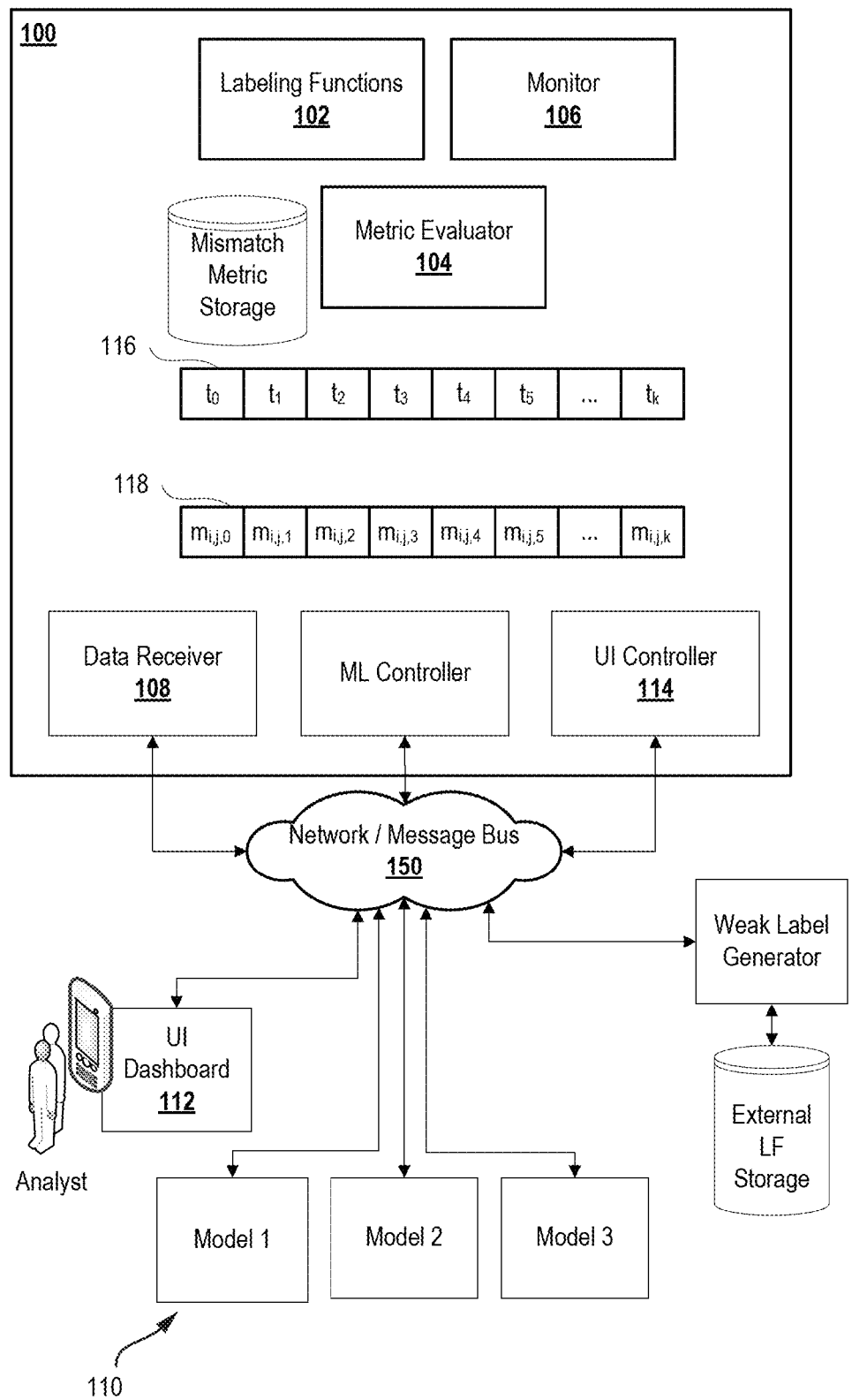
FIG. 1 is a schematic diagram of a system for machine learning monitoring, according to an embodiment.

Machine learning models are useful computational tools that can be trained for conducting various tasks, iteratively training various interconnection weights and/or parameters to minimize a particular loss function or to optimize towards a goal. In particular, a trained machine learning ("ML") model can be deployed in various downstream applications, both directly and indirectly. An example machine learning model application is the usage of a machine learning model in a securities/equities pricing engine that tracks price movement of various securities in respect of input market data and market sentiment data (e.g., data obtained from a readily available text sentiment mechanism such as Twitter™). Other types of models where the approach is useful can include natural language processing models for classifying documents where there has been no data annotated yet, models to determine environmentally sustainable companies based on SEC filings (e.g., no labels available yet).

A practical, technical challenge arises in relation to determining whether the model is performing at its expected level, and whether the model has computationally "veered off", months or years after deployment. Model performance can be degraded for various reasons, such as data shift changes relative to training data, changes in "ground truth" positive region definition, or model changes over time among others. In the market data example above, there could be transient domain shifts, among others.

These challenges are particularly difficult to overcome without "gold label" data that is manually curated and highly accurate. This is because without "gold label" data, the bounds of the true positive data manifold are not readily discernible. In practical real-world scenarios, there is often a lack of "gold label" data as it is expensive to label and simply unavailable. Accordingly, it is difficult to determine whether a model is performing correctly without feedback. In certain examples there may not be a feedback loop with the model in use. In other examples, even with a feedback loop it may operate as a slow process.

Determining performance is an important technical objective as it can be used to flag certain models as requiring remediation, or automatically shutting down the models and replacing them with better performing models and conducting remediation activities. In another embodiment, a reversion to a previous model may also be possible. A computational machine assessment approach is proposed in embodiments described herein that computationally attempts to monitor machine learning performance using weak labels as limited, imperfect proxies of the unknown true positive data manifold.

Table 1 below is an example showing example model performance assessments and potential remediation activities.

The definition of mismatch criteria to trigger remediation activities may be tunable in some embodiments, and can be based on various determinations, such as a raw number of mismatches being greater than a threshold, a ratio of mismatches relative to labeling function abstain outputs, a ratio differentiating different types of mismatches, etc. For example, the mismatch definition can be tunable using a tuning knob or slider using a user interface control element for a user interface that controls the operation of the machine learning assessment system.

Online monitoring of machine learning systems, in particular, comes with various difficulties. The foremost issue is the lack of ground truth for the incoming data from which performance can be evaluated. Reasons for changing performance include concept drift and domain shift. These occur when the data distribution changes from what has been used to train the machine learning systems. Approaches to measure this change include looking at distribution properties of the incoming data, or of the prediction of the machine learning model.

Although useful, alternate approaches of analyzing time series of these metrics (distribution properties of incoming data or of the prediction of the machine learning model) are hard to interpret and deviations from their normal behavior might not readily tied to a specific problem.

Another alternate method to monitor online systems involves having a human in the loop. The human may be the user of the system and be giving online feedback. However, the human in the loop may cause a poor user experience. Moreover, the feedback can only be obtained on predictions that the user has access to. This makes it difficult to monitor any hidden upstream machine learning model. If not the user, a third party may verify predictions offline, in which case the feedback is delayed.

In an example, a machine learning model can be designed to extract social media data (from a large number of potentially relevant posts) in real-time, comprehend the subject matter, and provide a label for each post indicating its type. For example, a post might be tagged as "press release", or "user review". These labels allow users to find the subset of social media posts that they are interested in.

However, to build a machine learning model to classify posts into these categories, it can be necessary to have high-quality labeled data for training. In other words, examples may be needed of social media posts that are manually labeled as press releases or user reviews to learn how to recognize new examples of the same type. Unfor-

| Model Description | Model Performance Outcome (based on generated metrics) | Remediation Activity |
| --- | --- | --- |
| Model 1 (natural language processing for internal chatbot) | Estimated_performance_issues = TRUE (mismatch criteria met) | Model shut down for investigation and removed from deployment. Model_decommission (Model1). Model to be re-trained/re-architected. Model_retrain (Model1). |
| Model 2 (automatic document classifier) | FALSE | Model continues to be in use. |
| Model 3 (online banking fraud estimator) | FALSE | Model continues to be in use. |
| Model 4 (automatic keyword processing engine for analyzing regulatory filings) | Estimated_performance_issues = TRUE (mismatch criteria met) | Labeling function that was activated (LF1) for investigation to assess whether there is a spurious conclusion. LF1 has been flagged for a large number of mismatches. If LF1 continually generates false alarms, the LF1 may need to be remediated. Labelingfunction_decommission (LF1) | tunately, manual labeling is arduous and slow. Moreover, it can be expensive if it is done by a machine learning team or if it requires domain experts.

Another alternate solution is to crowdsource the labeling activities (e.g., crowd-sourced manual labeling, such as using the Mechanical Turk™), but this brings extra data management costs to ensure labelers are trustworthy. Third-party labeling services can handle these concerns, but bring other challenges such as losing transparency during the labeling process, slowing turnover time, and managing the restricted use of sensitive data. Turnover time and labeling effort are a particular problem in the early phases of a project; things change frequently during the ideation phase, and labelers need clear-cut instructions, not fuzzy heuristics. A change of focus can impact previously labeled data and the work must start again from nothing. The R&D process becomes a very slow-moving dance.

Recent breakthroughs in NLP may decrease a need for labeled training data. Models may be pre-trained by teaching them to fill in missing words in sentences. This language modelling task does not require manual labels and allows for models to be built that transform the input text into a rich context-aware representation. This representation can be used as the input to a more specialized task. It can reduce the need for training data because it has already learned a lot about how language works and even has some basic common sense about the world. For example, such models can correctly complete a sentence like "The train pulled up to the . . . " with the word "station", so at least on a very superficial level, they can be considered to know something about rail transport. Although language models can reduce the need for manual labeling, some high-quality labeled data may still be required to train the model for the final task.

The following disclosure describes a proposed approach encapsulated as systems and methods capable of monitoring the performance and health of machine learning models with the help of programmatic labeling. The approach can be implemented in a machine learning monitoring system that is specially adapted to automatically assess and monitor the performance and health of machine learning models using programmatic labeling, despite a lack of "gold labels" through applying "weak labels" (e.g., obtained from a programmatic system), and then monitoring metrics associated with the "weak labels" in respect of the model outputs.

The system also provides insight into the online performance of the models for different subsets of unlabeled data. In particular, a machine learning monitoring and automated assessment approach is described in various embodiments described herein. In the proposed approach, weak supervision is proposed as a technical solution wherein labeling functions are utilized to assign labels to entire portions of a training set. The weak labels are generated using one or more labeling functions, and the labeling function itself can be modified and adapted to changing requirements, such as through the amending of a class definition, re-computing labels to better adapt to a region or shape to improve the accuracy of the weak labels.

The proposed approach of various embodiments described herein lends itself particular well to technical problems associated with machine learning models where a labeling function can be readily established, such as in respect of text classification problems. The labeling functions are also utilized to assess and monitor a particular model's performance, and as described in various embodiments below, machine learning outputs can be automatically generated that may be potentially indicative of different types of technical problems associated with shifts, such as domain shifts (where the distribution of input data changes) or concept drifts (where the relationship between the input data and the labels changes).

Conveniently, embodiments may improve on past online monitoring techniques by allowing online monitoring that is more precise and insightful than simply looking at data/model distributions, and involves no human in the loop. Aspects of programmatic labeling may improve the monitoring system. Programmatic labeling has been an active field of research with the goal to improve training of machine learning models by making use of unlabeled data, however little to no attention has been placed on its ability to be a powerful tool to monitor these same systems.

As discussed here, discrepancies between the model prediction outputs and labeling function outputs can be identified, and aggregated to establish an estimated score (e.g., a daily mismatch count as identified in aggregated statistics), and this estimated score could be a data output value that is indicative of a deviation from a norm that is received or monitored by a downstream alert/alarm system that automatically updates a dashboard or other user interface, or automatically generates service tickets or workflows to remediate or investigate the identified potential issues.

The systems and methods described herein can, in some embodiments, allow for automated alerts of performance changes and some embodiments can offer insight into the situation. For example, the proposed system can be implemented in a data center or a distributed resources-based infrastructure that operates a large number of different machine learning models adapted for different tasks. The proposed system could be implemented as a computer server appliance coupled to a messaging bus that receives inputs from or input trained machine learning models, conducts an assessment, and then generates performance outputs that can be encapsulated as a data output value. The data output value, in an embodiment, can be configured to track mismatches or anomalies over a period of time, and in a variation, an alert or alarm or downstream investigation/remediation workflows can be triggered through the detection of time-series outputs or signals generated from the mismatches or anomalies over the period of time.

The assessment is conducted using weak supervision approaches, which utilize labeling functions to assign weak labels to the incoming data and these labels can be obtained from a programmatic system and statistics on the weak labels correlation to the ML model outputs are tracked. The term "weak supervision" refers to training machine learning models using noisy labels instead of "gold" labels having high confidence. Such noisy labels or weak labels may be much easier to acquire than gold labels and can be used to train high-performing machine learning models in certain circumstances. The proposed system, in particular is directed to an improved approach for monitoring ML systems using weak supervision that can be adapted to use a variety of different approaches to create weak labels, such as using labeling functions.

An example labeling function can include:

```
function contains_review(text):
    if "review" in text:
        return POSITIVE_LABEL
    else:
        return NEGATIVE_LABEL
labeling function to find texts about hockey
function high_precision_labeling_func_is_hockey (text):
    if "puck" in text
```

```
        and "defensemen" in text
        and "hockey" in text:
    #(add all hockey keywords that one can imagine here)
        return POSITIVE_LABEL
    # return negative label if none of the keywords get a match
        return ABSTAIN_LABEL
```

The Snorkel™ [4] framework proposes a programmed labeling approach. The labeling functions methodology of Snorkel™ is an example of how to build a programmatic labeling system. The term "labeling function" ("LF") is used herein to denote any function that can assign a weak label to data.

In some embodiments, instead of labeling functions, other approaches to generate weak labels can be utilized. For example, weak labels can be provided to the system directly through another mechanism, as opposed to the system maintaining labeling functions directly.

Natural language processing (NLP) tasks may be well suited for the Snorkel™ framework due to the way text data is analyzed via code, allowing keyword-based labeling functions as disclosed herein to be coded.

Under Snorkel™, noisy labels are created by using easy-to-understand heuristics that come from domain knowledge of the data. For example, if a social media post contains the word "review," then it may be a user review. This can be a good rule of thumb, but there will be plenty of cases where this word is used and the post is about something completely different, and so the output is noisy. In practice, this heuristic is applied by a labeling function that takes the post and returns a label or indicates that it is uncertain by abstaining from returning a label. In this example, it might return a positive result if it sees the word "review" and indicate uncertainty if not. Other labeling functions might be focused on negative cases, and assign a negative label or indicate uncertainty.

A single labeling function can produce very noisy output, so several different labeling functions can be used and their outputs combined to produce a single label based on their agreement; this can be done by simple majority voting or other more involved methods. These final weak labels are then used to create training/validation and test datasets and the machine learning classifier is trained using suitable techniques.

Tracked statistics on weak label correlation to ML model outputs can be turned into time series data for online monitoring. Any method of outlier detection for time series [1] can then be used to create alerts whenever anomalies are encountered. As each time series is associated with a specific programmatic labeling function, the user receiving the alert also gains insight into the performance change of the monitored machine learning model.

This methodology can be supplemented with other methods used to monitor machine learning systems such as statistics of the prediction distributions, prediction confidences, and the like.

FIG. 1 illustrates a system 100 for machine learning monitoring, and can include labeling functions 102, a metric evaluator 104 and a monitor 106.

The system 100 operates by assessing performance of a target trained machine learning model. As there is a lack of a practically available set of "gold labels", it is technically challenging to measure how well the model is continuing to operate as circumstances and scenarios change. How the model is performing initially, for example, can be used as a baseline for performance.

The system 100 can include a data receiver 108 configured to receive new input data points (e.g., new input x) from an external server to be processed through the maintained labeling functions 102 for weak label generation, model outputs for the new input data points from the various models 110 (shown in example as Models 1, 2, 3, but could be Models 1, . . . , n), and the data receiver 108 can couple to a message bus 150 that coordinates communications of data packets as between various computing systems, among others. In some embodiments, the system 100 is controllable and tunable through a user interface dashboard 112 through a UI controller 114 that is coupled to metric evaluator 104 to modify various definitions and thresholds. For example, mismatch alarm/trigger thresholds can be tuned, various labeling functions of labeling functions 102 can be flagged as problematic and in need of replacement, among others. The UI controller can maintain a database of performance parameters for controlling operation of the system 100.

Machine learning model performance, for example, is measured by proxy by the system 100 through detecting mismatches, and characteristics of the mismatches can then be used to detect (i) domain shifts (e.g., the incoming data points may start populating very different regions of a positive data manifold, where a model does not perform well on), or in respect of (ii) concept drifts (positive data manifold changes because of how the problem is defined), or (iii) the model performance degradation relative to the positive or negative data manifold as a whole is degrading or has begun to degrade.

Performance can then be characterized as a Boolean output (e.g., booleanPerformanceProblem=TRUE/FALSE, a logit (e.g., a float value, or a normalized float value indicative of a propensity for a detected performance problem), or a confidence value, and be based on analyses of the metrics relating to the mismatches over time, for example (e.g., mismatches growing over time, geometrically increasing, not staying within a certain equilibrium or unexpected seasonality or cyclic effects). As described herein in some embodiments, performance can also be tracked across time-bins, shown as time bins 116, such that mismatch trends over time are required to trigger particular remediation actions. For example, if for a particular model, mismatches start diverging away from an equilibrium value (e.g., mismatches begin trending upwards), the positive slope of the mismatch curve across time bins can be used to trigger a de-activation of the particular model.

The system 100 is a machine learning monitoring and automated assessment system that can, for example, reside in a data center as a special purpose computational appliance (or reside in software on a server) that can, for example, connect to external deployed machine learning models or internally stored models to control model operation, for example, as a model hypervisor system that can "spin up" and "spin down" models as required, to allow for a swapping of models. The system 100 can be coupled to the models across a communications bus across network 150, and control the spinning down and spinning up through sending control signals across the network 150.

For example, in the context of a financial institution's systems, system 100 can be coupled to a set of models used for image classification tasks for cheque processing, a set of models for loan provisioning, a set of models for call fraud detection, a set of models for an internal IT chatbot, language translation, dictation, among others. There may be various models that can be used for a particular task, and in some embodiments, these models can be substituted for one another (e.g., backup models). In another embodiment, certain models are stored as "snapshots" of themselves such that a model can be rolled back to an earlier trained state (e.g., a chatbot).

Figure 4B:
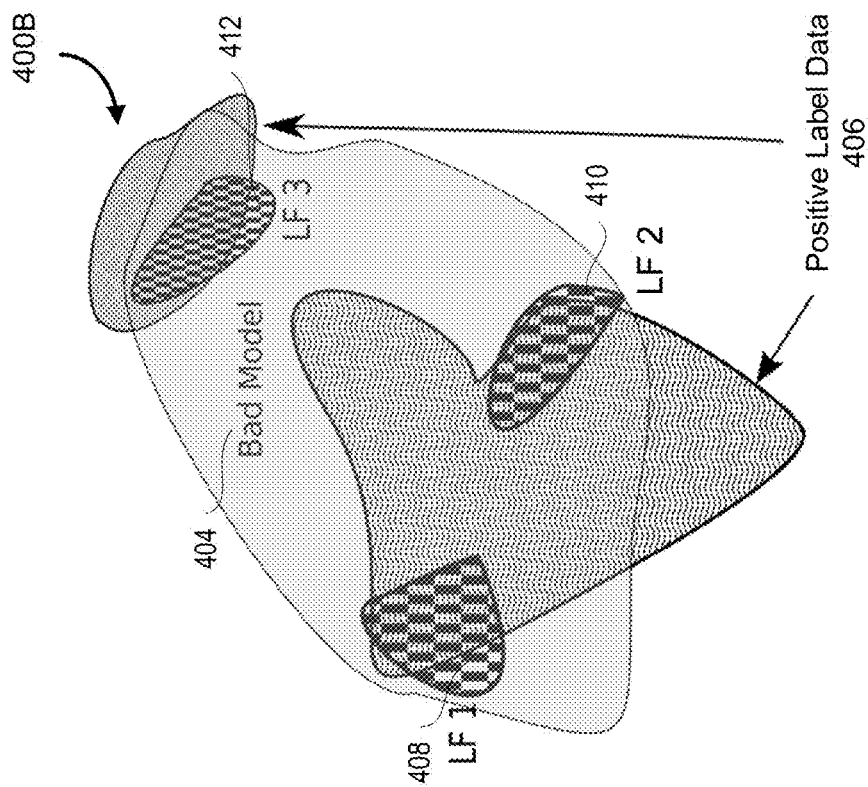
FIGS. 4A and 4B are schematics illustrating labeling functions in relation to labeled data points from a trained machine learning model and positive data, according to an embodiment.
Figure 4A:
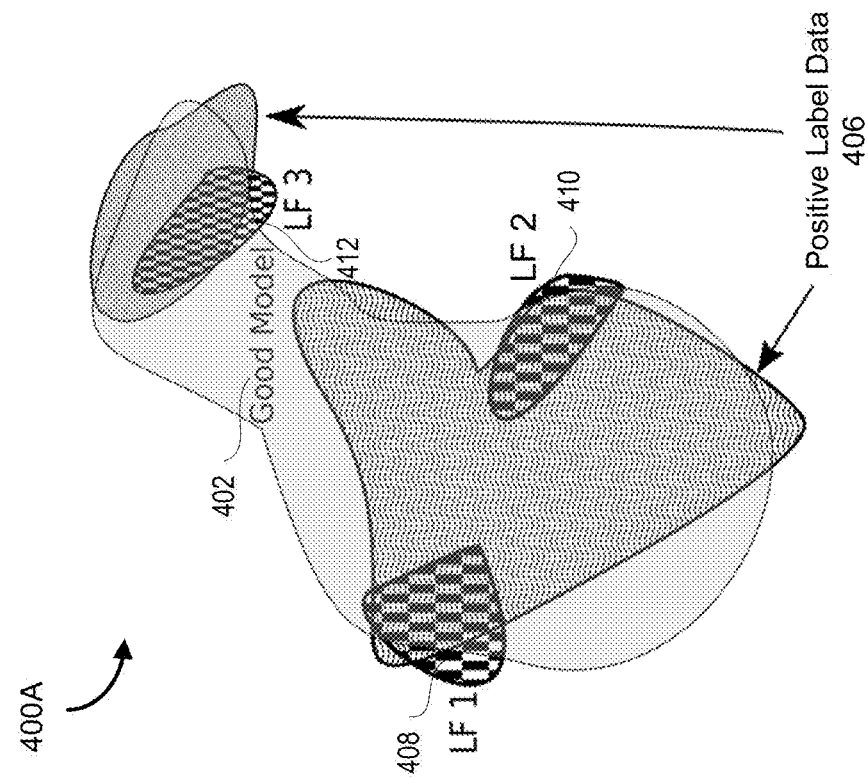
Figure 5:
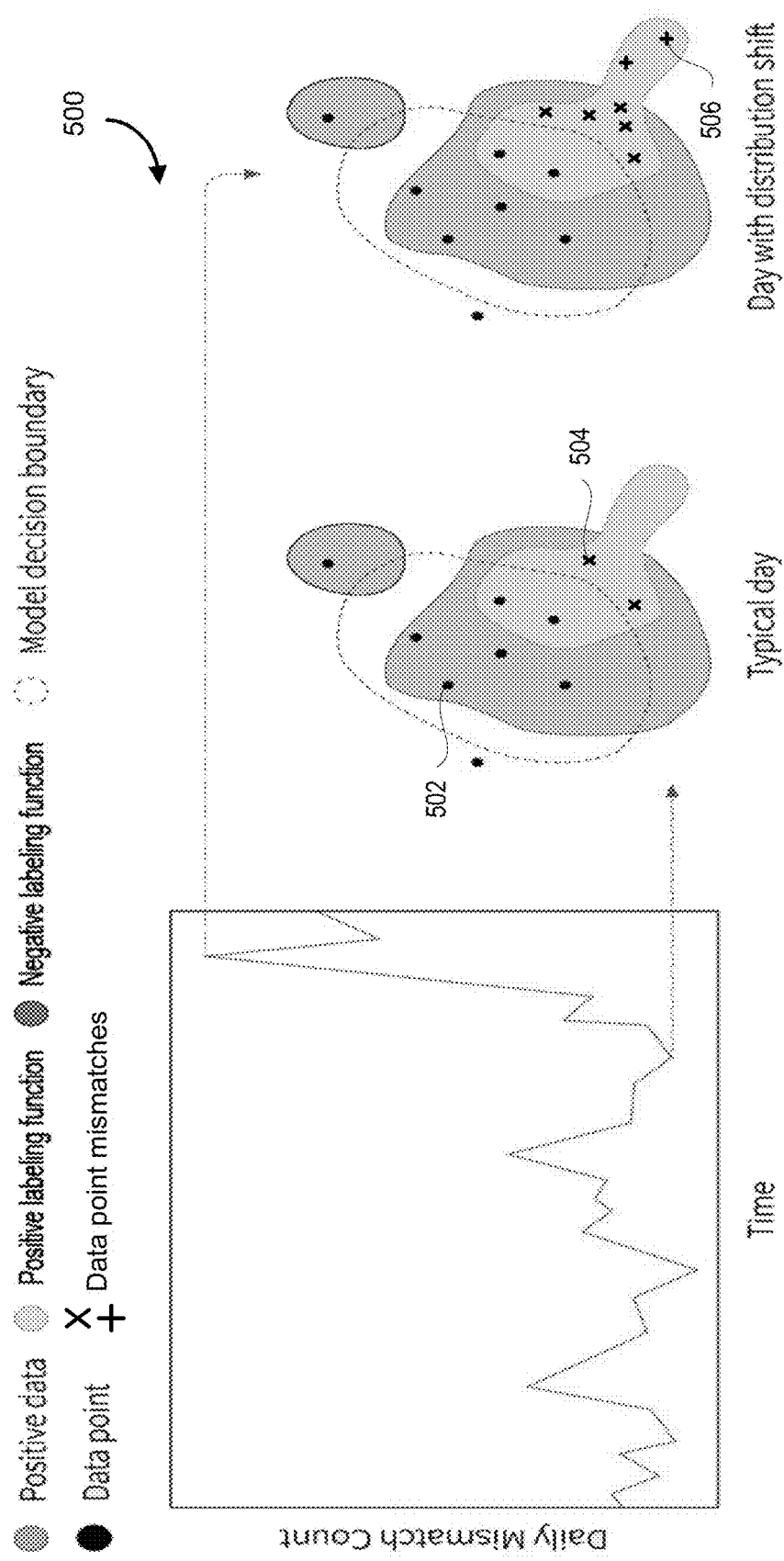
FIG. 5 illustrates a plot of a time series of mismatch count between the outputs of a labeling function and a model, according to an embodiment.

Model performance can be impacted by various reasons, such as the model itself shifting in undesirable ways (e.g., from the model of FIG. 4A to the model of FIG. 4B), or the incoming data shifting such that it is no longer well represented in the training sets and the incoming data now resides in a region of poor model performance (e.g., as shown in the models of FIG. 5, wherein a day with distribution shift impacts model performance).

For each model being investigated (all models in some embodiments, or just models presently being deployed in use, in other embodiments), the system 100 maintains a set of labeling functions 102, that can include, for example, positive labeling functions that are adapted in an attempt to track a particular sub-region of the positive data boundary. As there are no gold labels available, the labeling functions are utilized as a proxy signal in the form of a weak label region that, while potentially having small coverage, may have high precision and low recall. Alternatively, in another embodiment, system 100 instead receives the weak labels directly from another system.

As shown in FIG. 4A and FIG. 4B, each of the labeling functions 102 shown, in the positive regions, overlaps with a sub-region of the positive data region. However, because the labeling functions are using weak labeling approaches, between the two positive regions shown in FIG. 4A, and it can be used to train a better model.

Positive labeling functions of the labeling functions 102 can be configured to, for example, given an input x, output y if the one or more labeling function is confident that input x is within the corresponding specific coverage manifold, and abstains from generating the output y if one or more labeling function is not confident that input x is within the corresponding specific coverage manifold. Negative labeling functions can work in the opposite manner.

The system 100 periodically receives one or more incoming data points corresponding to new incoming data for processing through the target trained machine learning model. These incoming data points, for example, can be obtained from daily input data or extracts thereof, periodic test data sets, among others. In another embodiment, static test data sets can be utilized. In an optional step as provided in a variant embodiment, the system 100 can then be configured to determine whether the incoming data points are within the classification regions provided by the labeling functions. If the incoming data points are not within the classification regions corresponding to various labeling functions (e.g., the labeling functions return ABSTAIN), or in all classification regions, the incoming data point or set of incoming data points may not be particularly useful for an assessment. Accordingly, in some embodiments, the system 100 only returns a mismatch determination output if there are sufficient data points within the classification regions.

Table 2 shows an example of classification inputs given a set of inputs, $X_1$ to $X_5$.

| | LF1 | LF2 | LF3 | LF4 |
|---|---|---|---|---|
| $X_1$ | Match ($LF(x_1)$ = Model ($x_1$)) | ABSTAIN | ABSTAIN | Mismatch ($LF(x_1)$ = 0, and Model ($x_1$) = 1) |
| $X_2$ | ABSTAIN | ABSTAIN | Mismatch ($LF(x_2)$ = 1, and Model ($x_2$) = 0) | Mismatch ($LF(x_2)$ = 0, and Model ($x_2$) = 1) |
| $X_3$ | Match ($LF(x_3)$ = Model ($x_3$)) | ABSTAIN | ABSTAIN | Mismatch ($LF(x_3)$ = 0, and Model ($x_3$) = 1) |
| $X_4$ | ABSTAIN | ABSTAIN | ABSTAIN | Mismatch ($LF(x_4)$ = 0, and Model ($x_4$) = 1) |
| $X_5$ | ABSTAIN | ABSTAIN | Mismatch ($LF(x_5)$ = 1, and Model ($x_5$) = 0) | Mismatch ($LF(x_5)$ = 0, and Model ($x_5$) = 1) | there may be some regions that fall out of the positive data region, nonetheless. The labeling functions 102 shown in this example each have a substantial intersection with the unknown true positive data manifold within a corresponding specific coverage manifold. However, even if substantial intersection may not be available, useful results may be obtained. Different levels of intersection may be possible. For example, in FIG. 4A, LF1 does not have as much overlap relative to LF2 and LF3. However, as the labeling functions are used as "smoke tests", even if there is not perfect overlap, they are still useful for generating alerts. However, poor overlap in LFs may cause spurious alerts, and in some embodiments, a LF may also need to be modified if too many alerts are generated by weak labels associated with that LF.

The corresponding specific coverage manifold of each labeling function of the labeling functions 102 can then be used for future comparisons against the model predicted positive data manifold (e.g., as it evolves over time). In some embodiments, negative labeling functions can also be utilized (see FIG. 2). Negative labeling functions, for example, can track regions outside of the actual positive data manifold. For example, a negative function can be provided in As shown in Table 2, there are four labeling functions, LF1-LF4. Each of the input points are provided to the model and the labeling functions, which each generate outputs, Model ($x_n$), and $LF(x_n)$. If the labeling function is able to generate an output (e.g., $x_n$ falls within its classification region), it generates a value, otherwise it abstains. As $x_n$ may fall under various manifold regions, depending on the applicability of the labeling function, the labeling function may have a propensity to label or ABSTAIN, for example, if the size of the labeling function region is large or small, respectively. In this example, LF2 repeatedly returns ABSTAIN, which may be indicative that LF2 has too small of a classification region, or a potentially less relevant classification region relative to the distribution of the incoming data. In this case, an extended period tracked where LF2 returns ABSTAIN can cause the system 100 to automatically indicate that LF2 should be replaced with another labeling function.

Accordingly, the system 100 can be operated in an assessment mode or duration, the system 100 is configured to generate various weak labels using the incoming data points against the labeling functions 102 as well as the classification outputs using the target trained machine learning model.

The metric evaluator 104 is configured to identify a quantity of classification mismatches between the one or more weak data point labels and the one or more classification outputs, and the machine learning monitor 106 can be provided as a data process that is adapted to generate an alert signal relating to the target trained machine learning model based on a comparison of the quantity of classification mismatches relative to a threshold value.

The metric evaluator 104 is configured to track mismatches, which can be differentiated between different types of mismatches, as well as mismatches tracked over a period of time. Depending on the embodiment being implemented, different criterion for mismatches can be used as thresholds to cause different machine learning model assessment data outputs.

For example, in a first embodiment, the metric could be a raw mismatch count being greater than a threshold for a particular time-bin or received input data set. In a second embodiment, the metric rather is based on a normalized mismatch count, where the number of mismatches are divided by a total number of matches and mismatches. In a third embodiment, the metric is based on a normalized mismatch count, where the number of mismatches are divided by a total number of matches, abstains, and mismatches. These variations on metrics can be useful to avoid spurious conclusions when there is seasonality or cyclic effects present in the incoming data.

The mismatch type can also be differentiated as described above, having a MismatchType1 count that is counted only when a mismatch occurs where the input data is classified as within the LF classification region but not the model, and a MismatchType2 count that is counted only when a mismatch occurs where the input data is classified as within the model classification region but not the LF classification region.

Implementation of system 100 in an embodiment can be done via the following steps, described in further detail below:

1. Define labeling functions 102 $F=\{f_i | i \in 1, \ldots, N\}$. As described in a further embodiment, an example is provided in respect of a case study showing labeling functions being defined, and an example labeling function was provided above.
2. Define relevant metrics $M=\{e_j | j \in 1, \ldots, M\}$ by metric evaluator 104. Relevant metrics, for example, can include a single metric called the mismatch count, for example, among other variations.
3. Split time into discrete bins 116 $t_0, t_1, \ldots t_k, \ldots$. The time bins can be split into days, for example.
4. Compute the metric value 118 for every data point falling into each bins and aggregate to get $m_{i,j,k}$. The choice of aggregation, for example, can include a 7 day moving average).
5. Monitor, by monitor 106, the time series (i,j) with values $m_{i,j,k}$ for anomalies.
6. When an anomaly is found in time series (i,j), raise an alert to signal an issue with the data type being tracked by the HPLF $f_i$. The automatic alerts can include generating an email, changing a flag variable, rendering a visual element or sound such that it can be used for an analyst to be aware that some trouble may exist with their ML model.

In some embodiments, the alerts are also utilized to trigger workflows that remove the model from usage in a production environment (and in some embodiments, swap in another model) until the impugned model is cleared for operation (e.g., spurious problem), remediated (e.g., problem fixed through re-training), for example. In some embodiments, an earlier trained snapshot of a model can be substituted in an attempt to enhance performance (e.g., model from last week is automatically inserted for production uses, potentially due to drift of corruption from this week's inputs).

Labeling functions 102 can be quite powerful and offer many advantages. There can be a considerable difference in scalability between manually assigning a label to a single data point, and writing a labeling function that assigns labels to entire portions of the training set. In addition, an active learning procedure can be used to improve the assigned labels; it can be examined where the combined labeling functions make mistakes and write new labeling functions to cover these cases.

In some embodiments, a labeling function 102 can be a programmatic labeling system implemented as a High Precision Labeling Function (HPLF). Such labeling functions 102 can be created to capture domain expert's bias of how certain features should correlate with a specific prediction. Predictions can be done for both regression and categorical type problems. For example, a strategy may be to only output a positive label if all imaginable keywords are found in the text, and if one is missing, output an abstain label. A concrete example is shown in the function called high_precision_labeling_func_is_hockey, provided above.

Programmatic labeling systems can be created using a number of strategies, some of which are outlined in [7].

In some embodiments, labeling functions 102 do not propose a label if they are too uncertain and so a set of labeling functions 102 may only be sensitive to part of the whole data space. In cases where a labeling function 102 is uncertain, it may output an abstain flag. An abstain label can be based on a confidence level of the labeling function 102. The ability to abstain from giving a prediction can allow labeling functions 102 to be programmed with a high precision.

A labeling function 102 can be used in a similar manner to "smoke tests"-their outputs are to agree with the main machine learning model and disagreements signal potential issues. A set of labeling functions 102 does not need to exhaustively label all the data but the more coverage, the better. A precision-recall trade-off can be evaluated on a case-by-case basis.

Figure 2:
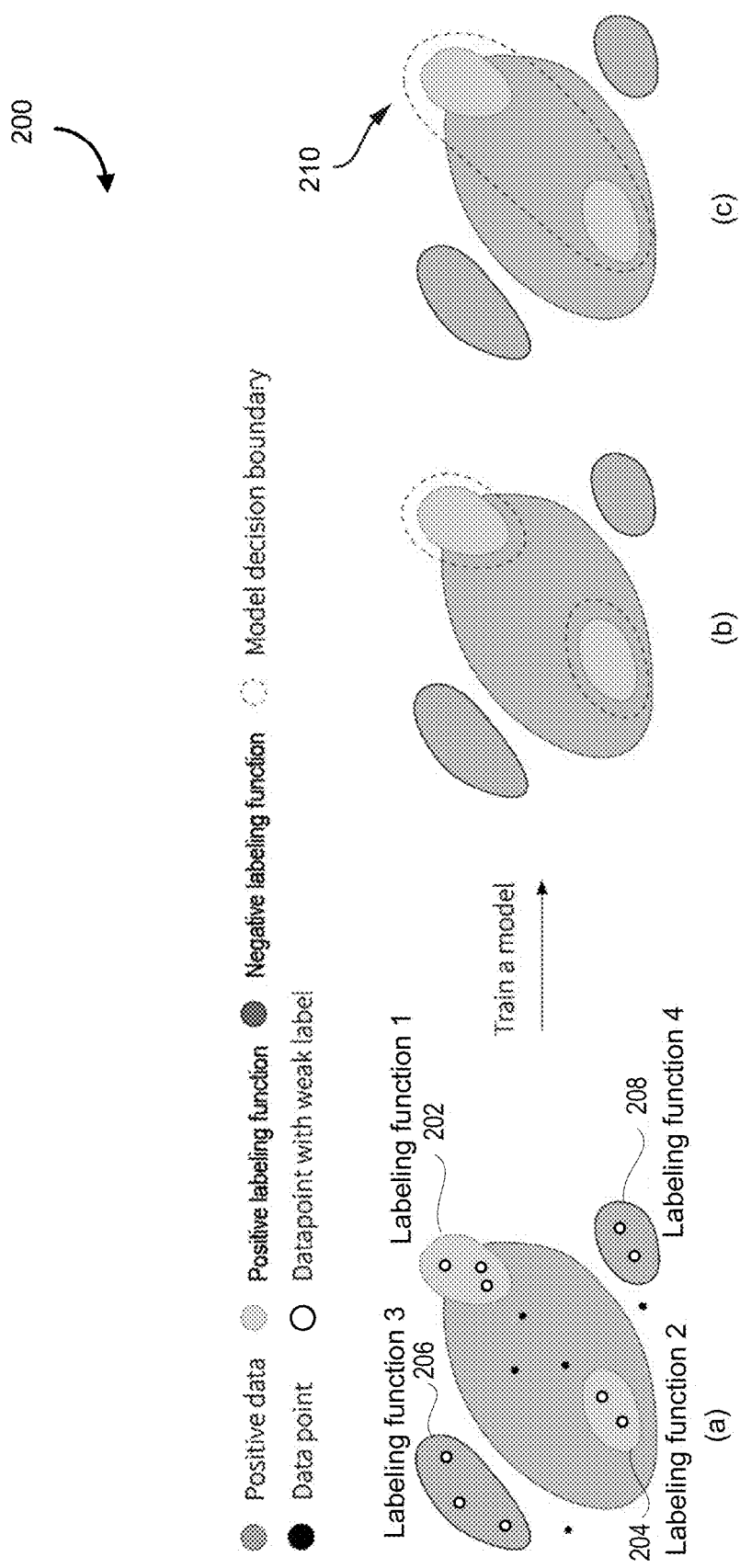
FIG. 2 is a schematic illustrating an application of labeling functions, according to an embodiment.

FIG. 2 illustrates a schematic 200 of system 100 applying labeling functions 102 with four defined labeling functions 102; two of the labeling functions 102 generate positive labels and two generate negative labels. Only data that fall within the regions covered by the labeling functions 102 would be usable for supervised learning. However, it is possible to generalize the resulting trained model outside these regions using regularization techniques.

In FIG. 2, different types of labeling functions are shown to provide examples of different types of labeling functions. Other variations on labeling functions are possible, and in an alternate embodiment, the weak labels corresponding to each input data point are instead provided directly to system 100 where the labeling functions or other weak labels are maintained on separate systems. As described above, the labeling functions operate as imperfect proxies of the positive data manifold region, as the positive data manifold region is not known.

FIG. 2 illustrates a schematic 200 of (a) the true manifold for the positive class of a binary classification problem is shown as "Positive data".

Four labeling functions 102 are defined with limited coverage: their decision boundaries are in yellow/gray and corresponds to assigning positive/negative labels. Labeling function 1 202 and labeling function 2 204 shown in this embodiment are positive labeling functions 102. Labeling function 3 206 and labeling function 4 208 shown in this embodiment are negative labeling functions 102.

When a new input data point is provided, a first check is to determine whether the point falls within the region that is being assigned the weak label, and the labeling function only returns a value if it does. For a positive labeling function, it returns a value that it should be classified as positive. For a negative labeling function, it returns a value that it should be classified as negative.

Because the labeling functions function as proxies of the positive data manifold region, they can be used to approximate the performance of the machine learning model in a limited sense (limited in the applicability of their coverage regions). Only the subset of data points falling within these regions are assigned a weak label and can be used to train a model. In respect of FIG. 2, it is important to note the overlap/intersection between the labeling functions 1 202 and 2 204, and the unknown positive data manifold region. As can be observed in FIG. 2, the labeling functions 1 202 and 2 204 serve as proxies of the unknown positive data manifold region. Conversely, labeling functions 3 206 and 4 208 are outside the unknown positive data manifold region and can be used as proxies for data points that should be classified as being in the negative region.

At step (b), a model is trained with high precision. High precision means that the functions label the data points in the labeling function regions as positive, and abstain from labeling anything else. Accordingly, due to the high precision, when this labeling function is used and it assigns a positive label, it is almost correct, but positive cases may be missed.

At step (c), regularization can help the trained model to generalize/expand beyond the coverage of the labeling functions 102. It is important to note in step (c), the model decision boundary has expanded. However, in its expansion, it is important to further note that some parts of the model decision boundary now lie outside of the positive data region. If the model decision boundary has expanded too far (or shifted in deleterious ways), the model performance could be degraded. For example, if the model was used to classify whether an image was a picture of an airplane or not an airplane, in the region where the model decision boundary has expanded beyond the positive data region (see step (c), the area on the upper right 210), the labeling function 1 can be utilized to classify whether a point should be in or not in the positive data region. Mismatches can occur for example, where there are different classifications as between the labeling function weak label and the model output label, and these mismatches can be tracked to provide an automated, but potentially imperfect assessment of model performance.

The imperfection can arise through imperfections in the coverage of the labeling functions. As shown in this figure, labeling function 1 202 also has a region slightly outside of the positive data manifold region, and this non-overlapping area could potentially lead to incorrect classifications. In a variation of system 100, the system can also be configured to monitor labeling function performance (e.g., % of abstain, % of incorrect classifications from downstream investigation), and flag or automatically replace/modify labeling functions when labeling function performance has significantly degraded. This degradation can occur either if the labeling function was poorly defined initially, or the unknown positive data manifold region shifted since the original definition (e.g., concept drift).

Another advantage of using labeling functions 102 is that they may be more readily understood and modified. A sudden change in the definition of a class can be handled by an audit of labeling function 102 code. This can be quickly modified to align with the new definition, as shown by way of example in FIG. 3. As described earlier, this is useful in situations where there is poor overlap either as a result of poor initial definition or concept drift.

From a practical perspective, implementing programmatic labeling on large text classification problems may reduce model development time from weeks to days. This may allow for quicker iterations with the end users which improves the product development cycle as a whole.

Figure 3:
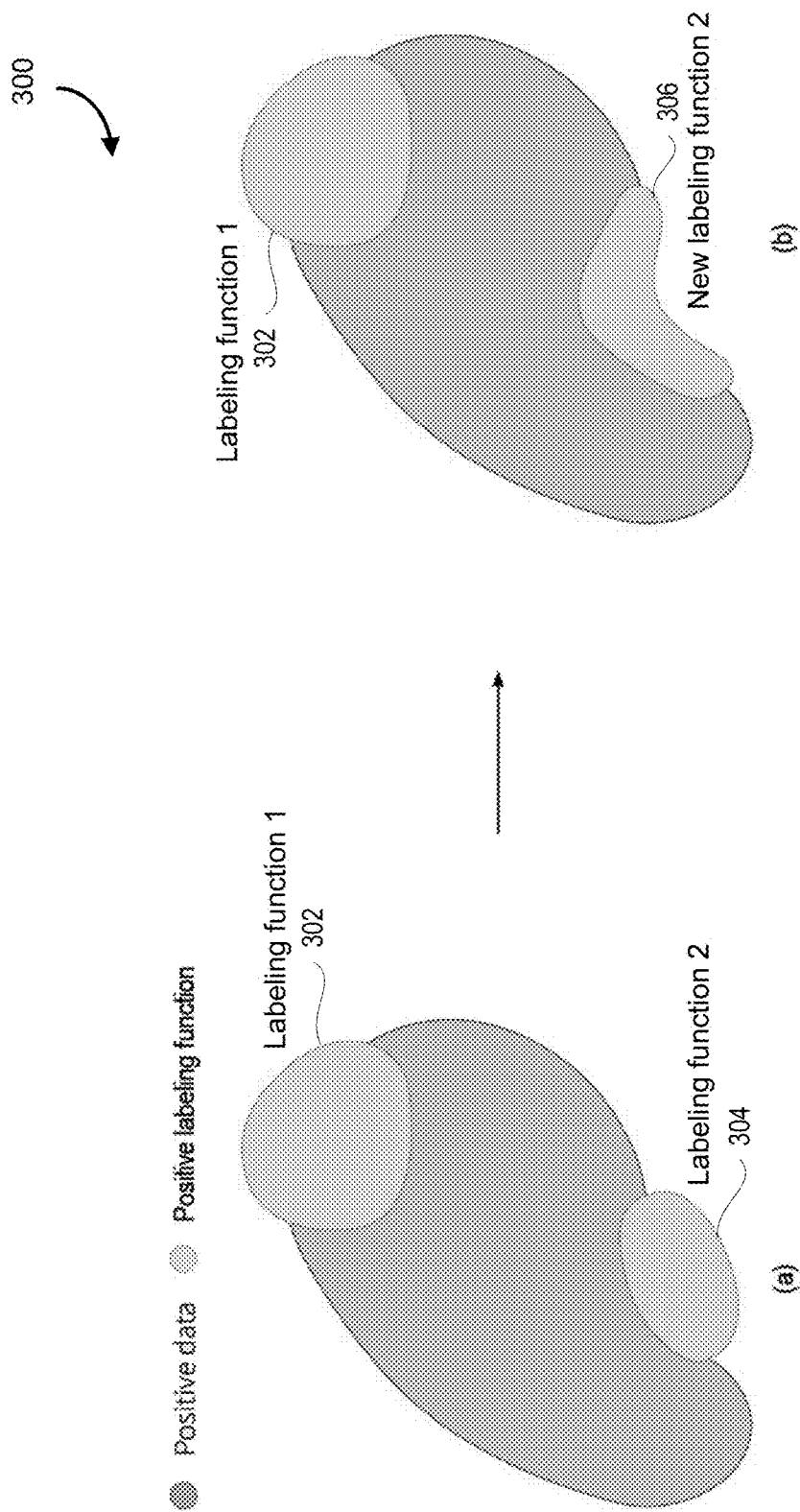
FIG. 3 is a schematic illustrating a modification of a programmatic labeling function, according to an embodiment.

FIG. 3 is a schematic 300 illustrating a modification of programmatic labeling functions. At step (a), two positive labeling functions 102 are illustrated ("Labeling function 1" 302 and "Labeling function 2" 304), and programmatic labeling allows for quick adaption to changing requirements.

When the class definition is modified (so the positive data region changes), the original labeling function 2 304 may become inadequate by labeling many examples outside the positive data region as positive. At step (b) the source code of labeling function 2 304 can be modified by a programmer after conducting analysis and the weak labels can be recomputed.

As shown in FIG. 3, at (a), labeling function 2 304 has poor overlap with the positive data region. This can be identified, for example, through trial and error or manual verification against the outputs of the labeling function. In another embodiment, the system 100 can also maintain, in data storage, a data record indicative of performance of each labeling function 102, and automatically flag anomalies as defined in logical rules.

When a labeling function 102 is identified for remediation, the system 100 can replace it or re-tune it as shown in (b). In (b), the labeling function 2 304 has been modified into "New labeling function 2" 306 and adheres better to the shape of the positive data region.

FIGS. 4A and 4B illustrate the data manifold for a binary classification problem, according to an embodiment. When new input data points are received, they can be classified using the model and the various labeling functions.

FIG. 4A and FIG. 4B each show different variations 400A and 400B of a particular model. The model 402 in FIG. 4A adheres somewhat better to the actual positive label data manifold region. The model 404 in FIG. 4B adheres less to the actual positive label data manifold region.

However, because the actual positive label data manifold region 406 is not known (due to the lack of gold labels), the labeling functions are used as proxies for downstream machine learning model performance analysis.

The "Positive Data" shape delimits the positive label data, or ground truth. In both FIG. 4A and FIG. 4B, a set of three labeling functions (labeled as "LF 1" 408, "LF 2" 410, and "LF 3" 412) having high precision are shown. The labeling functions are high precision as they label the data points in the labeling function regions as positive, and abstain from labeling anything else. The labeling function regions mostly intersect with the true positive data manifold 406, however note that their small coverage implies a low recall.

When a new input data point is received, a classification output or abstention is generated from each of the labeling functions.

Mismatches can occur where a point is classified by the labeling function in a weak label indicating that the point is in the positive or negative region, and where the model classifies the point differently. Table 3, below, shows an example output for three input data elements.

|  | LF1 | LF2 | LF3 |
|---|---|---|---|
| $X_1$ | Match (LF($x_1$) = Model ($x_1$)) | ABSTAIN | ABSTAIN |
| $X_2$ | ABSTAIN | ABSTAIN | Mismatch (LF($x_2$) = 1, and Model ($x_2$) = 0) |
| $X_3$ | Match (LF($x_3$)= Model ($x_3$)) | ABSTAIN | ABSTAIN |

A trained model assigns a positive label to data points in the "Model" region.

FIG. 4A and FIG. 4B differ solely by the model's coverage, and such change may occur after retraining. This difference illustrates how insight may be gained into this change in performance by comparing the model's prediction with its correlations to the three labeling functions: the correlation with labeling function 2 ("LF 2") 410 will be lower for the right model 404, signaling a probable drop in model performance. It is important to note that this insight (e.g., this drop in probable performance) is gained without knowledge of the "Positive Data" region 406, which would be the gold labels.

In an example of a labeling function 102 for text classification, text can be classified about the topic of "Hockey".

A simple labeling function could be (in Python pseudo code):

```
def simple_hockey_lf(text):
    return True if "hockey" in text else ABSTAIN
```

In this example, any text with the word "hockey" appearing will be labeled as "hockey". This may tag a lot of text that mentions hockey but the topic in question may have nothing to do with hockey, therefore the labels will be said to be noisy. Additional functions can be used to cover pieces of text where hockey does not appear.

Additional labeling functions 102 can be based on more keywords such as:

```
def less_simple_hockey_lf(text):
    keywords = [skate, puck, stick]
    return True if all keywords in text else ABSTAIN
```

This is a labeling function 102 that is a bit more complex, as it only tags a text as "hockey" if a series of keywords are found. The series of keywords here are skate, puck, stick.

In some embodiments, a labeling function 102 can be configured to track for keywords as described above, and assign a score for every keyword found.

Above a threshold, the labeling function 102 assigns the label, otherwise it abstains. For example:

```
def complicated_hockey_lf(text):
    keywords = [(skate, 0.5), (puck, 0.5), (stick, 0.5)]
    score = sum of value of all keywords in text
    return True if score > threshold else ABSTAIN
```

In some embodiments, scores and thresholds are heuristics that can be handpicked. The threshold can be a score that is pre-defined or modifiable (e.g., using a tuning knob or other visual interface control element), such as 0.99 in the case above, where if two of the keywords are there, it returns TRUE.

The above examples relate to text classification type problems. It will be understood that different types of labeling functions can be written to handle other types of datasets, such as images. There are many suitable ways to write such functions.

In an example, a set of labeling functions 102 can be denoted by $F=\{f_i|i\in 1,\ldots,N\}$. Given an input x, the set can be translated into a number of predictions, $$f_i(\vec{x}) = \begin{cases} \vec{y}_i & \text{if the } LF \text{ is confident} \\ \text{ABSTAIN} & \text{if the } LF \text{ is uncertain} \end{cases}$$

where the details of a labeling function's certitude or confidence is determined by its internal logic.

Metric evaluator 104 can be configured to determine metrics for the data points (N predictions) generated by labeling functions 102. These metrics can include, but are not limited to, mean squared error (MSE), and label mismatch, as noted below.

These N predictions can be compared to the output of a machine learning model, Model($\vec{x}$)=$\vec{y}$. Any relevant statistics can be used for this.

If f is a vector of floats for a regression task, suitable regression metrics can be used such as mean squared error (MSE) between the two values, $e(y, y_i)=MSE(y,y_i)$. On the other hand, for a classification problem, a binary metric such as label mismatch can be used:

$$e(y,y_i)=1 \text{ if } y \neq y_i \text{ else } 0. \quad (1)$$

Assuming M metrics being defined, they can be tracked with the label j. j is used, for example, to track metrics such as MSE, or a hamming distance, etc. Hence for every data point, one has a potential M×N lf-metric pair, $$m_{i,j}=e_j(y,y_i). \quad (2)$$

In an online setting (online, meaning data is available only in a sequential order) for example, data may arrive in discrete instances. Time can be discretized in an infinite number of bins 116 denoted by $t_0, t_1, \ldots, t_k, \ldots$ and the available metrics of data points that falls in these bins aggregated into a single value.

For metrics such as the MSE, an average can be taken, while for the label mismatch a mismatch count can be taken. This aggregation step can be done on all data points that were not given the ABSTAIN flag, resulting in M×N time series with values 118 $m_{i,j,k}$ where k denotes the time bin.

In some embodiments, anomalies can be detected in a time series by monitor 106. An alert for a time series (i,j) can signal that there is a potential problem with the model when trying to predict data that is labeled by a labeling function 102 $f_i$.

For a trained model deployed to production, monitor 106 can utilize a set of labeling functions 102 to monitor the model's performance, which can be particularly useful with live text data streams, in an example.

The dangers of domain shift (in which the distribution of input data changes) and concept drift (in which the relationship between the input data and the labels changes) are very real and detecting them is challenging.

Labeling functions 102 have different coverage than the trained model and it is possible to exploit this fact to devise a system sensitive to these phenomena in the live data distribution. On a typical day, a certain number of discrepancies between the model's prediction and prediction by labeling functions 102 can be expected. These can be referred to as mismatches.

By looking at aggregated statistics, such as the daily mismatch count, an informatively useful time series signal can be created wherein a deviation from the norm is indicative of issues with the system or the machine learning model.

In this setting, labeling functions 102 can be considered as acting like smoke detectors that sound an alarm whenever there is a change in the part of the data distribution for which they are designed to capture. FIG. 5 illustrates this approach.

FIG. 5 illustrates a plot 500 of a time series of mismatch count between the outputs of a labeling function 102 and the model. A shift in the distribution of input data points 502 (for example, from "Typical day" to "Day with distribution shift" as shown in FIG. 5) may cause additional mismatches 504 and 506 which translates to a change in the expected count. When such anomalies in the time series are seen, alerts can be raised to the relevant stakeholders.

Referring to FIG. 5, a technically challenging case is depicted when the distribution of incoming data changes. The incoming data points may start populating very different regions of the positive data manifold, one where the (static) model does not perform well on. This is a domain shift. For example: consider a model detecting cars trained only on images in the summer, once winter arrives, the model is now encountering images of cars covered in snow and the (static) model will now perform quite poorly.

This distribution shift can also cause technical challenges with the system 100. As shown in FIG. 5, in a day with a distribution shift, some of the new input data point mismatches 506, denoted by "+" in FIG. 5, are now in a "panhandle region", which fall outside of the distribution of the original training data, and can be spuriously identified by the positive labeling function as being in the positive data region (when they should not be). Observing the distribution of data for a typical day and a day with distribution shift, and one can observe how the mismatch count metric is quite high.

One example of anomaly detection for a time series with no trend is to model its values with a simple distribution. For example, the value of the temperature over the course of the year then can be modeled as a Gaussian distribution. A timescale much larger than its seasonality (a year) can be selected, and the average and the standard deviation of the observed data point of the time series computed. From there, the probability of any new observed data point can be calculated. An alert may be raised to signal an anomaly whenever a data point falls below or above a threshold number of standard deviation from the mean.

A similar approach can be employed to signal alerts in a time series signal generated as disclosed herein. In some embodiments, more involved methods such as Adaptive Windowing (ADWIN) can be used. This can occur when heuristics such as the one described above does not suffice such as for time series with seasonal variation where the series may have large deviations in a historical fashion but much smaller variations on a day to day basis.

A concrete example is temperature changes over the year where the average may be 10 degree Celsius with a 20 degree Celsius standard deviation, yet one would never expect such change to occur in a single day and therefore one would never raise any alerts if the threshold for the system was set to 1 standard deviation.

Techniques such as ADWIN can be used to solve these issues.

Embodiments of system 100 may capture deviation from expected behavior whenever there is a divergence between the usual performances of the labeling functions as compared to the main ML system's prediction. Hence it may not be crucial that the labeling functions have a high precision for the alerts to signal an issue, while still having use. However to interpret the alert and problems, it may be important to understand what features of the data is being analyzed by the labeling functions. Therefore the success of the implementation may depend on the quality of the labeling functions. Data sources that have features difficult to describe and tie to labels may not work as well.

In some embodiments, when data shift affects the outputs of labeling functions and the main ML predictions in the same fashion, the differences captured by the metrics may show no deviation from their historical behavior. Data shift may occur on features that are not being monitored by any label functions, hence only ABSTAIN labels are produced for these data points and the predicted value of the main ML system cannot be compared to anything.

An added benefit of some embodiments of system 100 is that labeling functions 102 typically capture some domain knowledge about the data. This occurs as the labeling functions are likely coded having some knowledge of the underlying problem. For example, to write a labeling function that determines if a text has a weak label of "hockey" if it mentions the world "skate", one needs to be aware that text "skate" is a concept that is often related to the theme of "hockey". Creating a time series signal per labeling function thus allows for anomalies to be tied or linked to the aspect of the data for which they were designed.

In experimental work to-date, an embodiment of system 100 was using noise filters to clean a data stream of news about a biotech organization and after a few months a large spike in daily mismatch counts was seen. Upon close examination, it was discovered that the company had released results of an important trial and one of the labeling functions was tagging the related text snippets as noise due to a confounding acronym. Many more such examples were seen after the deployment of this system. Generally, having this level of interpretability worked best when the labeling functions 102 had high precision, and so not all the labeling functions 102 were directly converted into monitoring signals; many were reworked to have less coverage (recall) but higher precision.

In some embodiments, system 100 has the ability to insert automated checks that the deployed model was performing adequately. As such, it can play a big role in confidence of the system performance and transform alarms into actionable tasks in which the team would often uncover regions of the data distributions that a deployed model was not well trained to handle. This would be fixed by writing new labeling functions and doing a full retraining.

Recent work using hand-crafted rules to monitor the output of machine learning models has been developed through the idea of model assertions [3]. These are functions that assert consistency relations between the data and the output. These consistency relations are discussed in the context of streaming data where one expects some level of regularity between time steps, for instance a model acting on video frames should expect similar output for subsequent frames where no scene change occurs.

Model assertions differ from embodiments disclosed herein, which can deal with statistics over many data samples which can be independent from each other. The Snorkel™ team also has a machine learning platform that advertise monitoring tools on their technology page [6], however the features are not public. A paper [5] by some of the Snorkel™ members outline a machine learning pipeline that relies heavily on the ideas behind Snorkel™, however their monitoring system is described via human defined tags on individual data points and seem to employ a methodology that is far from the "set and forget" goal of embodiments disclosed herein.

A case study was performed by applying system 100, in an embodiment, to monitor a neural based model that attempts binary classification of tweets (short texts of 280 or less characters) to determine if the tweets discuss the price movement (positive class) of an underlying equity. The model was trained using weak supervision using keyword based labeling functions. The use of weak supervision during training was because there was not an annotated dataset of tweets made by human labelers that could be trusted. In other words, there was not a datasets of tweets with gold labels for this particular classification task.

A different, and simpler, set of five labeling functions 102 were created for monitoring purposes. Four of these new functions 102 assigned a positive label whenever a keyword in their keyword set was seen in the tweet. The four positive functions 102 are assigned names returns, technical, charts, options to represent the rough topic of the keywords they monitor. As an example, the labeling functions named technical made use of keywords such as rsi, sma, stochastic, boillinger, triangle pattern, head and shoulder, and the like.

Figure 6:
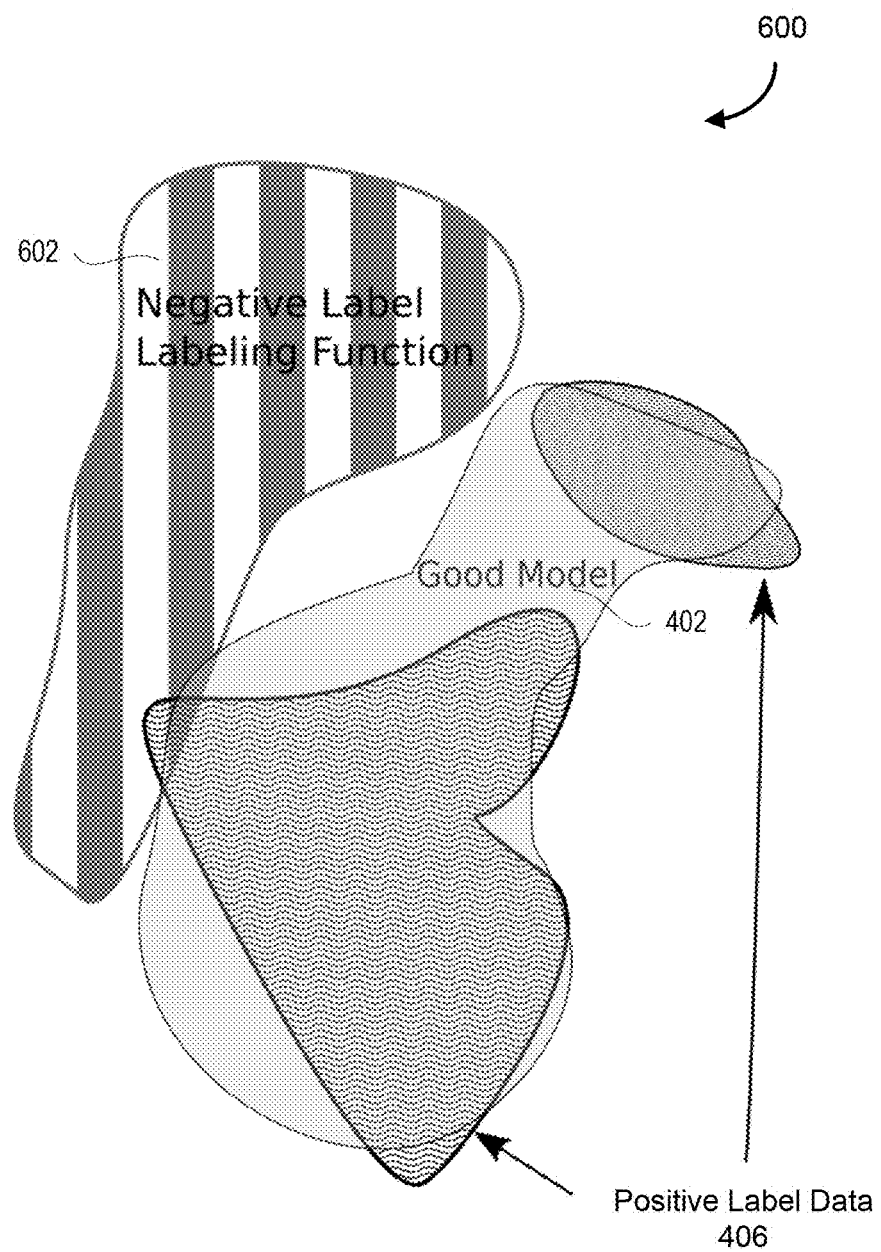
FIG. 6 illustrates an example of the coverage for a labeling function that focuses on a negative class, according to an embodiment.

A fifth function 102 called negative was created from an even larger list of keywords and assigns a negative label to tweets where none of its keywords are found. The negative labeling function 102 covers the data manifold akin to what is pictured in the example 600 as "LF 4" 602 in FIG. 6. FIG. 6 illustrates an example of the coverage 600 for a labeling function ("LF 4" region 602) that focuses on the negative class.

The model to be monitored runs over a user's Twitter™ stream and filters out tweets that are deemed to discuss price movement. Different users will follow different topics and hence their time correlation between the labeling functions 102 and the price movement classifier are likely to have different descriptive statistics. Therefore, this scenario calls for an application of the method on a per user basis.

To showcase this implementation, two simple streams are examined that surface all tweets with the cashtags "$BIIB" for the first stream and "$MA" for the second. A cashtag is a Twitter™ tag created from a traded company's ticker preceded by a dollar sign. For example, "$BIIB" is the ticker for a biotech company named Biogen™. The stream following this ticker can contain many technical tweets discussing clinical trial results. On the other hand $MA is the ticker for Mastercard™, whose tweets tend to be similar to companies within the technology sector.

A time series signal can be created by the 7-day moving average of daily mismatch counts divided by the 7-day moving average of daily tweet volume. A 7-day window may be used since there can be strong weekly seasonality in the tweet volume when following cashtags as the stock market is closed on weekends.

Figure 7A:
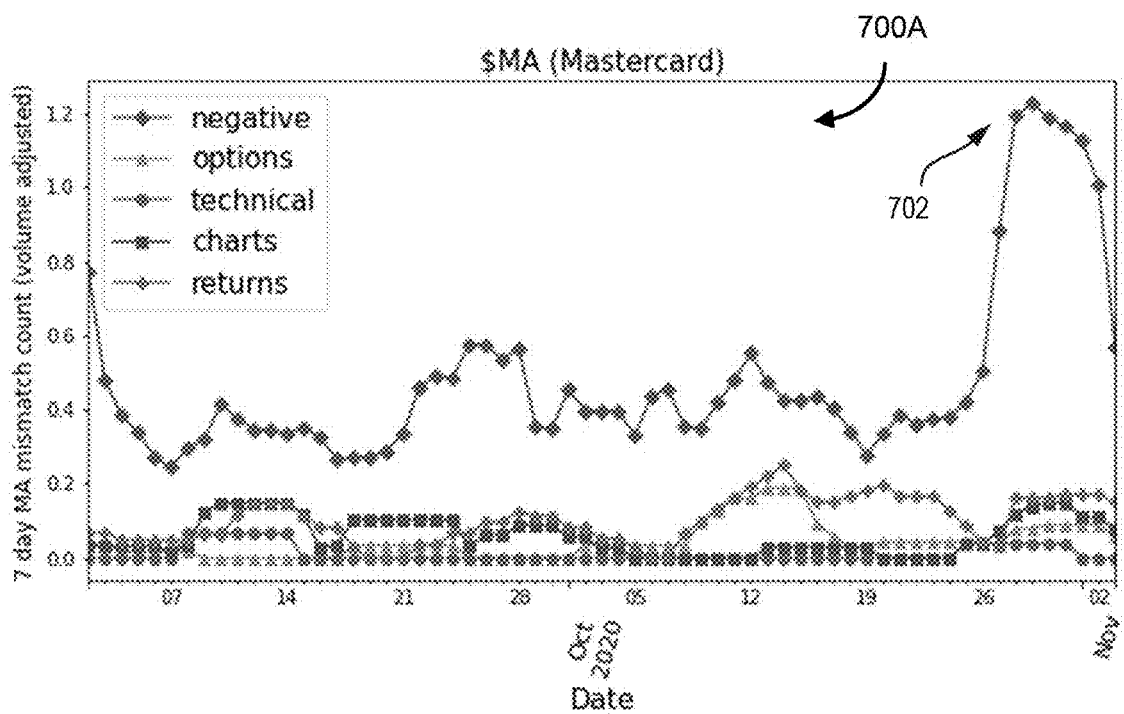
FIGS. 7A and 7B illustrate plots of time series data of volume adjusted mismatch count between a model and various labeling functions, according to an embodiment.
Figure 7B:
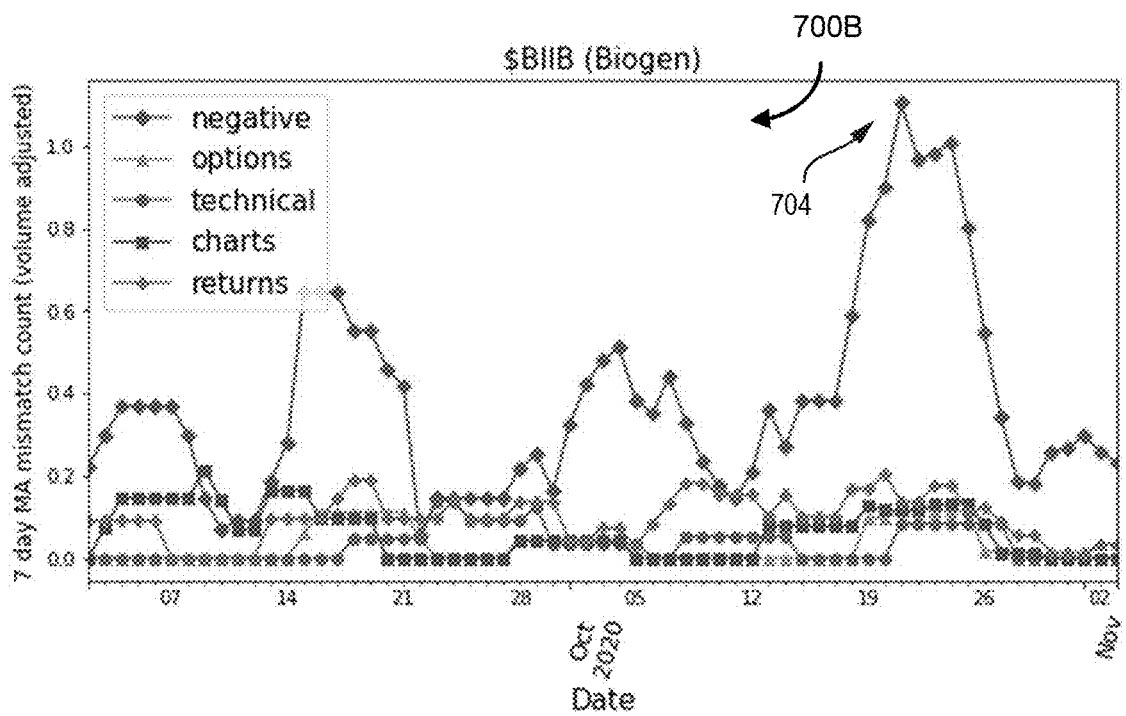

Time series data is shown in FIGS. 7A and 7B. As shown, the typical value of the negative curve is greater than for the others, however, this may not be surprising given the much larger data coverage of the negative labeling function 102.

FIGS. 7A and 7B illustrate time series of volume adjusted mismatch count between a model, in this example a movement price neural-based classifier, and various labeling functions. FIG. 7A is a plot 700A of a 7-day moving average (MA) mismatch count (volume adjusted) plotted against date for $MA (Mastercard™). FIG. 7B is a plot 700B of a 7-day moving average (MA) mismatch count (volume adjusted) plotted against date for $BIIB (Biogen™).

Both plots have peaks 702 and 704, near the end of October, and these peaks would trigger alerts in concept drift detection algorithms such as ADWIN (see [2] for details) and therefore warrant an investigation. Upon retrieving the responsible tweets, correlations were found between the two peaks and the earning dates of both companies. A large fraction of tweets discussing price movement around earnings were erroneously flagged as belonging to the negative class by the negative labeling function 102.

The case study as illustrated in FIGS. 7A and 7B shows the ability of embodiments of system 100 to capture data distribution shift that were not accounted for. In this case, the model worked as intended and no action has to be taken on that end, however the negative labeling function used for monitoring may want to be updated to not trigger alerts on future earning dates.

Figure 8:
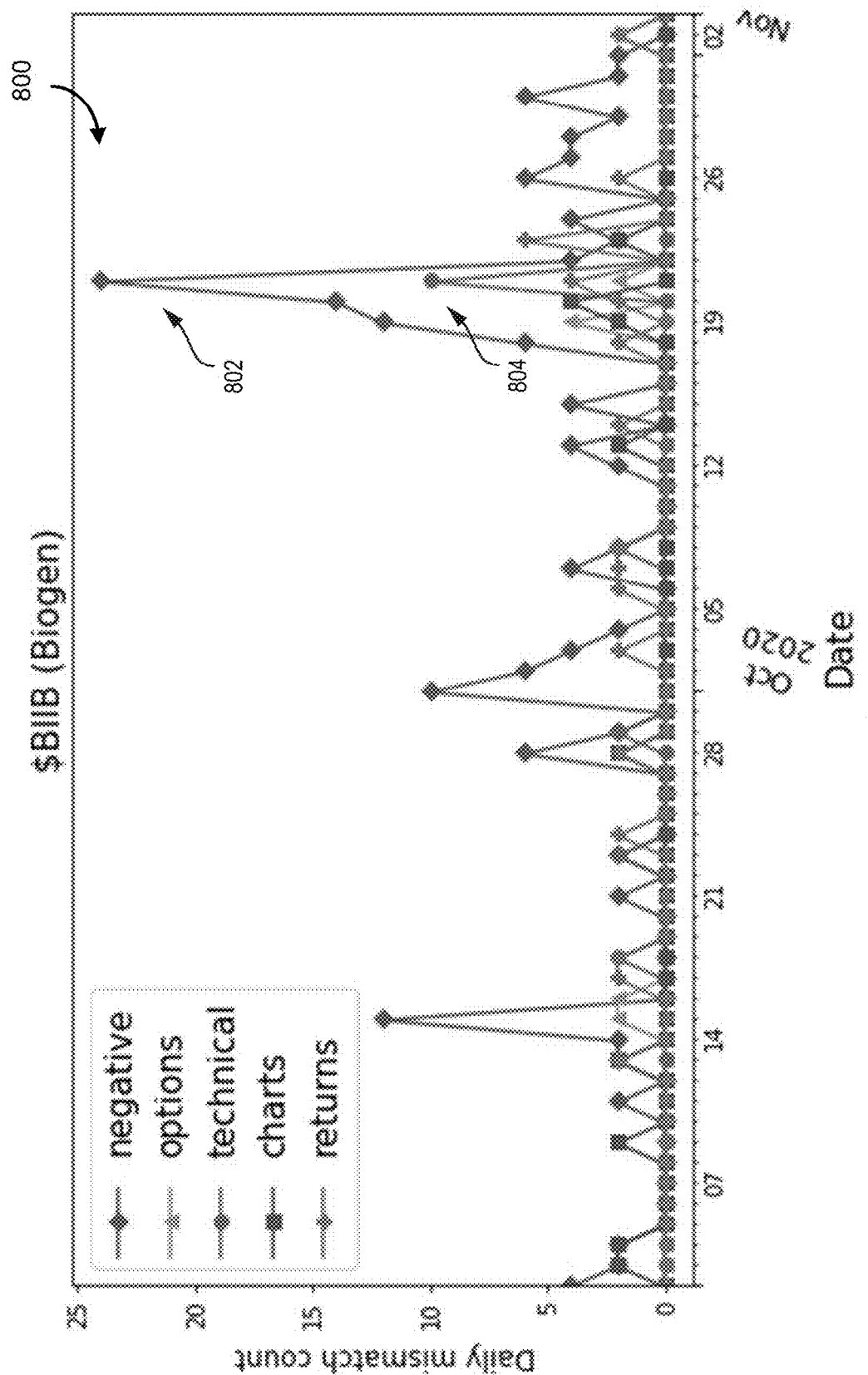
FIG. 8 illustrates a plot of raw daily mismatch counts between a model and various labeling functions, according to an embodiment.

Raw daily counts such as FIG. 8 illustrates in plot 800, may also reveal insights. It may be necessary not to confuse large deviation from the norm with a simple increase in daily tweet volume. For instance, the peak 802 associated with the earnings date is seen in both plots in FIGS. 7A and 7B for the negative labeling function 102 but a similar peak 804 for the technical labeling function 102 is only seen in raw count.

Given the sparse mismatch count of the technical labeling function, the responsible tweets were investigated. A second event was uncovered: the release of a clinical trial result for a drug treating Spinal Muscular Atrophy (SMA). This caused the technical labeling function 102 to label them as positive as Stochastic Moving Average (SMA) is also common abbreviation in technical analysis. The mismatch was also due to the poor precision of the labeling function and not of the model. This showcases the potential issue of false alerts when an event with domain shift exists and the labeling functions are not of very high precision.

The case study described above shows the concrete ability of using an embodiment of system 100 to monitor ML systems. During two months of monitoring, two cases of transient domain shift were uncovered in the streaming data source. This was done without human intervention and provided confidence in the performance of the deployed model.

Figure 9:
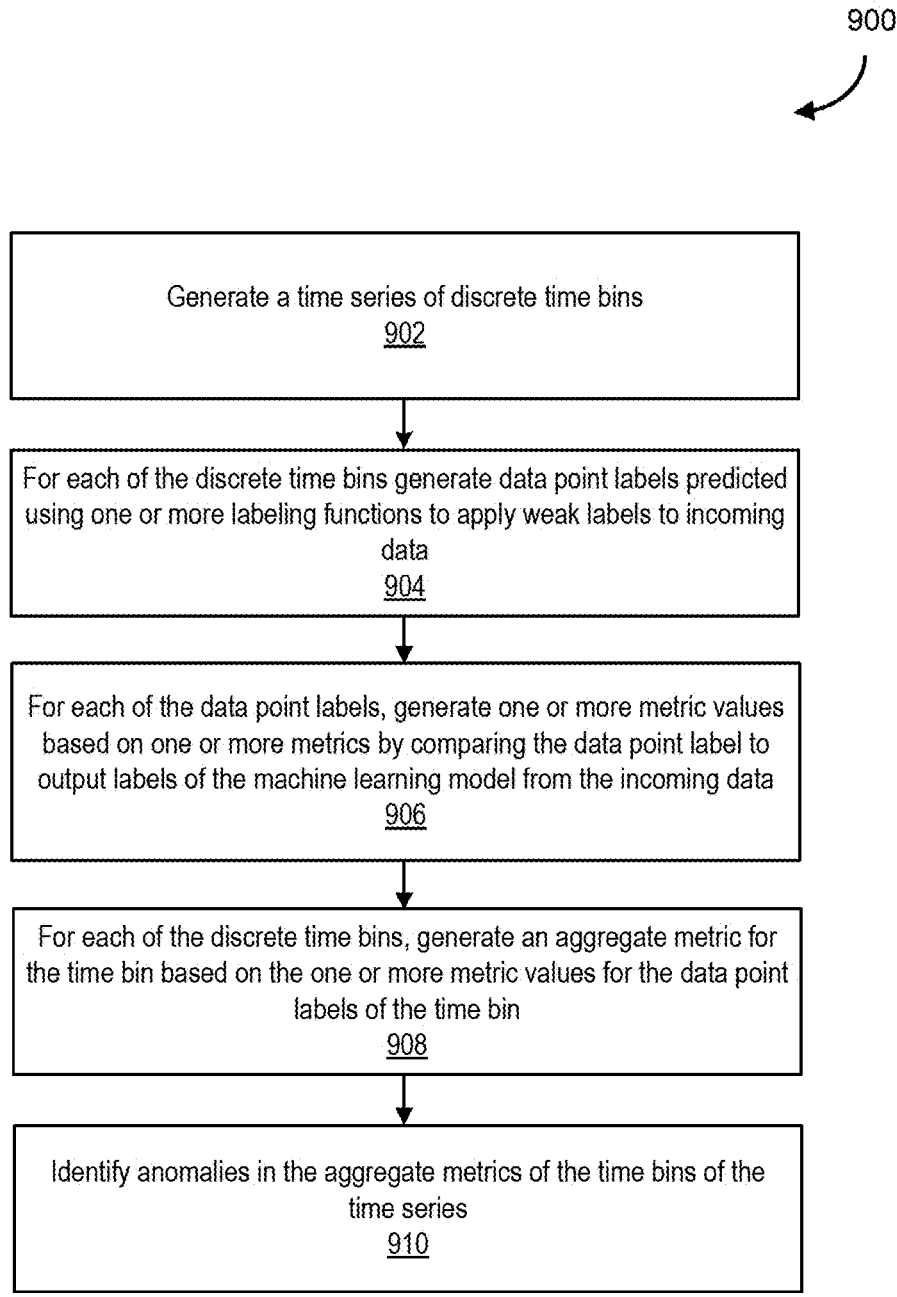
FIG. 9 is a flowchart of a method for machine learning monitoring, according to an embodiment.

FIG. 9 illustrates an embodiment of a method 900 for monitoring a machine learning model. The steps are provided for illustrative purposes. Variations of the steps, omission or substitution of various steps, or additional steps may be considered. It should be understood that one or more of the blocks may be performed in a different sequence or in an interleaved or iterative manner.

At block 902, monitor 106 generates a time series of discrete time bins.

At block 904, for each of the discrete time bins, data point labels are generated using predictions of one or more labeling functions 102 to apply weak labels to incoming data.

At block 906, for each of the predicted data points, metric evaluator 104 generates one or more metric values based on one or more metrics by comparing the data point labels to output labels of the machine learning model from the incoming data.

In some embodiments, the comparing is based at least in part on a regression metric.

In some embodiments, the regression metric is a mean squared error.

At block 908, metric evaluator 104 generates an aggregate metric for the time bin based on the one or more metric values for the data point labels of the time bin.

In some embodiments, certain of the data point labels are omitted from the generated aggregate metric based on a confidence level of the labeling function.

At block 910, monitor 106 identifies anomalies in the aggregate metrics of the time bins of the time series.

Figure 10:
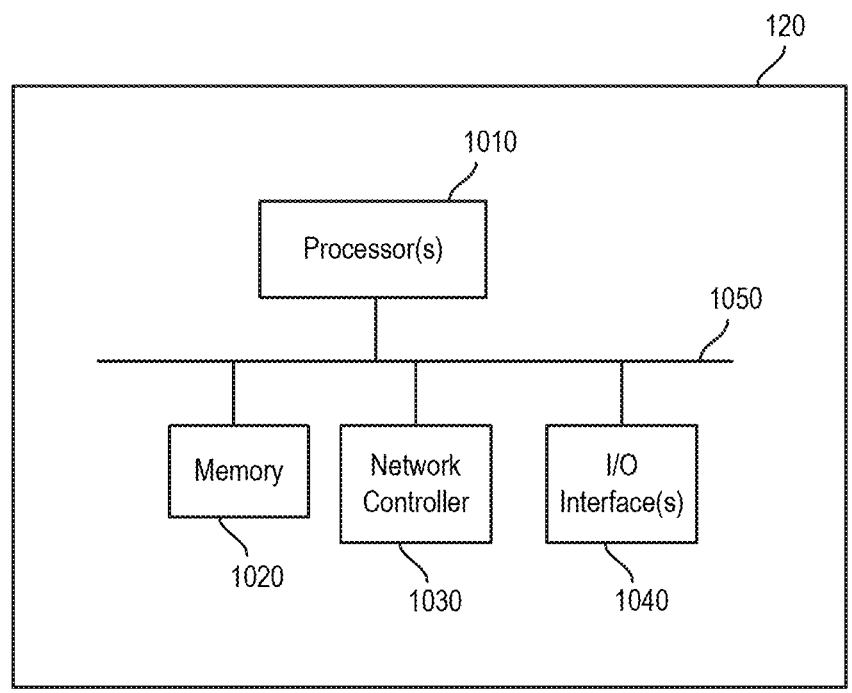
FIG. 10 is a block diagram of example hardware components of a computing device for machine learning monitoring, according to an embodiment.

System 100 for machine learning monitoring may be implemented as software and/or hardware, for example, in a computing device 120 as illustrated in FIG. 10. Method 900, in particular, one or more of blocks 902 to 910, may be performed by software and/or hardware of a computing device such as computing device 120.

FIG. 10 is a high-level block diagram of computing device 120. Computing device 120, under software control, may monitor a machine learning model.

As illustrated, computing device 120 includes one or more processor(s) 1010, memory 1020, a network controller 1030, and one or more I/O interfaces 1040 in communication over bus 1050.

Processor(s) 1010 may be one or more Intel x86, Intel x64, AMD x86-64, PowerPC, ARM processors or the like.

Memory 1020 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 1030 serves as a communication device to interconnect the computing device with one or more computer networks such as, for example, a local area network (LAN) or the Internet.

One or more I/O interfaces 1040 may serve to interconnect the computing device with peripheral devices, such as for example, keyboards, mice, video displays, and the like. Such peripheral devices may include a display of device 120. Optionally, network controller 1060 may be accessed via the one or more I/O interfaces.

Software instructions are executed by processor(s) 1010 from a computer-readable medium. For example, software may be loaded into random-access memory from persistent storage of memory 1020 or from one or more devices via I/O interfaces 1040 for execution by one or more processors 1010. As another example, software may be loaded and executed by one or more processors 1010 directly from read-only memory.

Example software components and data stored within memory 1020 of computing device 120 may include software to perform machine learning monitoring, as disclosed herein, and operating system (OS) software allowing for communication and application operations related to computing device 120.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the various described embodiments.

REFERENCES

[1] Ane Blázquez-Garcia, Angel Conde, Usue Mori, and Jose A. Lozano. A review on outlier/anomaly detection in time series data, 2020.

[2] Joáo Gama, Indre Žliobaite, Albert Bifet, Mykola Pechenizkiy, and Abdelhamid Bouchachia. A survey on concept drift adaptation. ACM Comput. Surv., 46(4), March 2014.

[3] Daniel Kang, Deepti Raghavan, Peter Bailis, and Matei Zaharia. Model assertions for monitoring and improving ml models, 2020.

[4] Alexander Ratner, Stephen H. Bach, Henry Ehrenberg, Jason Fries, Sen Wu, and Christopher Re. Snorkel. Proceedings of the VLDB Endowment, 11(3):269-282, November 2017.

[5] Christopher Re, Feng Niu, Pallavi Gudipati, and Charles Srisuwananukorn. Overton: A data system for monitoring and improving machine-learned products, 2019.

[6] https://www.snorkel.ai/technology.

[7] www.snorkel.org/resources/.

What is claimed is:

1. A system for assessing performance of a target trained machine learning model having a model predicted positive data manifold adapted to conduct classification based on an unknown true positive data manifold representative of a ground truth for a task being conducted by the target trained machine learning model, the system comprising: a processor coupled with computer memory and data storage, the processor configured to:

generate, a set of one or more labeling functions, each adapted for high precision by having a substantial intersection with the unknown true positive data manifold within a corresponding specific coverage manifold, each of the one or more labeling functions configured to generate a set of corresponding weak data point labels whereby given an input x, the one or more labeling functions outputs y if the one or more labeling function is confident that input x is within the corresponding specific coverage manifold, and abstains from an output if one or more labeling function is not confident that input x is within the corresponding specific coverage manifold;

periodically receive one or more incoming data points corresponding to new incoming data for processing through the target trained machine learning model;

generate one or more weak data point labels using the one or more labeling functions corresponding to the one or more incoming data points;

generate one or more classification outputs using the target trained machine learning model corresponding to the one or more incoming data points;

identify a quantity of classification mismatches between the one or more weak data point labels and the one or more classification outputs; and generate an alert signal relating to the target trained machine learning model based on a comparison of the quantity of classification mismatches relative to a threshold value, wherein the model predicted positive data manifold changes over time as the target trained machine learning model is periodically updated through iterative training, or wherein a distribution of the one or more incoming data points changes over time; and wherein the quantity of classification mismatches between the one or more weak data point labels and the one or more classification outputs is tracked over a duration of time.

2. The system of claim 1, wherein the distribution of the one or more incoming data points changes due to domain shifts where a distribution of input data changes.

3. The system of claim 1, wherein the distribution of the one or more incoming data points changes due to concept drifts where a relationship between the one or more incoming data points and the one or more weak data point labels changes.

4. The system of claim 3, wherein the comparison of the quantity of classification mismatches relative to a threshold value includes tracking mean squared errors between corresponding weak data point labels and corresponding classification outputs for each of the one or more incoming data points.

5. The system of claim 1, wherein the target trained machine learning model operates in an online setting where incoming data is sequentially received in discrete instances, and the processor is further configured to:
    discretize time into a plurality of time bins; and wherein the identification of the quantity of classification mismatches between the one or more weak data point labels and the one or more classification outputs is conducted on a per-time bin basis.

6. The system of claim 5, wherein the alert signal is generated if the classification mismatches for any bin is greater than a threshold value.

7. The system of claim 5, wherein the alert signal is generated if the classification mismatches across a set of time bins of the plurality of time bins indicates a positive slope greater than a threshold value.

8. The system of claim 1, wherein the alert signal causes a de-commissioning or a substitution of the target trained machine learning model.

9. The system of claim 1, wherein the alert signal causes a re-training of the target trained machine learning model.

10. The system of claim 1, wherein the classification mismatches between the one or more weak data point labels and the one or more classification outputs is determined as a mean square error.

11. A method for assessing performance of a target trained machine learning model having a model predicted positive data manifold adapted to conduct classification based on an unknown true positive data manifold representative of a ground truth for a task being conducted by the target trained machine learning model, the method comprising:
    generating, a set of one or more labeling functions, each adapted for high precision by having a substantial intersection with the unknown true positive data manifold within a corresponding specific coverage manifold, each of the one or more labeling functions configured to generate a set of corresponding weak data point labels whereby given an input x, the one or more labeling functions outputs y if the one or more labeling function is confident that input x is within the corresponding specific coverage manifold, and abstains from an output if one or more labeling function is not confident that input x is within the corresponding specific coverage manifold;
    periodically receiving one or more incoming data points corresponding to new incoming data for processing through the target trained machine learning model;
    generating one or more weak data point labels using the one or more labeling functions corresponding to the one or more incoming data points;
    generating one or more classification outputs using the target trained machine learning model corresponding to the one or more incoming data points;
    identifying a quantity of classification mismatches between the one or more weak data point labels and the one or more classification outputs; and
    generating an alert signal relating to the target trained machine learning model based on a comparison of the quantity of classification mismatches relative to a threshold value,
    wherein the model predicted positive data manifold changes over time as the target trained machine learning model is periodically updated through iterative training, or wherein a distribution of the one or more incoming data points changes over time; and
    wherein the quantity of classification mismatches between the one or more weak data point labels and the one or more classification outputs is tracked over a duration of time.

12. The method of claim 11, wherein the distribution of the one or more incoming data points changes due to domain shifts where a distribution of input data changes.

13. The method of claim 11, the distribution of the one or more incoming data points changes due to concept drifts where a relationship between the one or more incoming data points and the one or more weak data point labels changes.

14. The method of claim 13, wherein the comparison of the quantity of classification mismatches relative to a threshold value includes tracking mean squared errors between corresponding weak data point labels and corresponding classification outputs for each of the one or more incoming data points.

15. The method of claim 11, wherein the target trained machine learning model operates in an online setting where incoming data is sequentially received in discrete instances, and the processor is further configured to:
    discretize time into a plurality of time bins; and wherein the identification of the quantity of classification mismatches between the one or more weak data point labels and the one or more classification outputs is conducted on a per-time bin basis.

16. The method of claim 15, wherein the alert signal is generated if the classification mismatches for any bin is greater than a threshold value.

17. The method of claim 15, wherein the alert signal is generated if the classification mismatches across a set of time bins of the plurality of time bins indicates a positive slope greater than a threshold value.

18. The method of claim 11, wherein the alert signal causes a de-commissioning or a substitution of the target trained machine learning model.

19. The method of claim 11, wherein the alert signal causes a re-training of the target trained machine learning model.

20. A non-transitory computer readable medium, storing machine-interpretable instruction sets which when executed by a processor, cause the processor to perform a method for assessing performance of a target trained machine learning model having a model predicted positive data manifold adapted to conduct classification based on an unknown true positive data manifold representative of a ground truth for a task being conducted by the target trained machine learning model, the method comprising:
    generating, a set of one or more labeling functions, each adapted for high precision by having a substantial intersection with the unknown true positive data manifold within a corresponding specific coverage manifold, each of the one or more labeling functions configured to generate a set of corresponding weak data point labels whereby given an input x, the one or more labeling functions outputs y if the one or more labeling function is confident that input x is within the corresponding specific coverage manifold, and abstains from an output if one or more labeling function is not confident that input x is within the corresponding specific coverage manifold;

periodically receiving one or more incoming data points corresponding to new incoming data for processing through the target trained machine learning model;

generating one or more weak data point labels using the one or more labeling functions corresponding to the one or more incoming data points;

generating one or more classification outputs using the target trained machine learning model corresponding to the one or more incoming data points;

identifying a quantity of classification mismatches between the one or more weak data point labels and the one or more classification outputs; and generating an alert signal relating to the target trained machine learning model based on a comparison of the quantity of classification mismatches relative to a threshold value, wherein the model predicted positive data manifold changes over time as the target trained machine learning model is periodically updated through iterative training, or wherein a distribution of the one or more incoming data points changes over time; and wherein the quantity of classification mismatches between the one or more weak data point labels and the one or more classification outputs is tracked over a duration of time.

* * * * *